US012725171B2

(12) United States Patent
R et al.

(10) Patent No.: US 12,725,171 B2
(45) Date of Patent: Sep. 1, 2026

(54) SYSTEM AND METHOD FOR AUTOMATED COMPLIANCE ANALYSIS OF DIGITAL CONTENT

(71) Applicant: Bank of America Corporation, Charlotte, NC (US)

(72) Inventors: Sreeram R, Tamil Nadu (IN); Ria Jamshedji, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/930,361

(22) Filed: Oct. 29, 2024

(65) Prior Publication Data

US 2026/0120117 A1 Apr. 30, 2026

(51) Int. Cl.
*G06Q 30/018* (2023.01)
*G06N 5/02* (2023.01)

(52) U.S. Cl.
CPC ............ *G06Q 30/018* (2013.01); *G06N 5/02* (2013.01)

(58) Field of Classification Search
CPC ............................... G06Q 30/018; G06N 5/02
See application file for complete search history.

(56) References Cited

U.S. PATENT DOCUMENTS 10,320,569 B1 6/2019 Wentz et al.
11,444,769 B2 9/2022 Wentz
11,561,522 B2 1/2023 Cooley et al.
11,670,188 B2 6/2023 Aharonson et al.
11,681,417 B2 * 6/2023 Nair ..................... G06F 3/0484 715/733
11,882,541 B2 1/2024 Khoryaev et al.
11,972,693 B2 4/2024 Aharonson et al.
12,028,867 B2 7/2024 Li et al.
12,035,241 B2 7/2024 Islam et al.
12,039,612 B1 7/2024 Zumpano
2020/0343985 A1 10/2020 O'Shea et al.
2021/0007129 A1 1/2021 Talarico et al.
2021/0076359 A1 3/2021 Sosnin et al.
(Continued)

OTHER PUBLICATIONS

Sreeram R et al., "System and method for multi-modal data processing with federated learning neural networks", U.S. Appl. No. 18/930,484, filed Oct. 29, 2024.
(Continued)

*Primary Examiner* — Jessica Lemieux
*Assistant Examiner* — Emily M. Kraisinger

(57) ABSTRACT

A system for automated compliance analysis of digital content is disclosed. The system accesses digital content comprising at least one of text, an image, an audio, or a video. The system extracts a first set of features from the digital content. The first set of features comprises at least a physical attribute of the digital content. The system extracts a second set of features from a compliance document. The second set of features comprises an indication of a compliance guideline to present the digital content. The system evaluates the first set of features against the second set of features. In response, the system determines whether the digital content meets the compliance guideline. The system generates a feedback message that reflects the determination of whether the digital content meets the compliance guideline. The system outputs the generated feedback message.

20 Claims, 8 Drawing Sheets

(56) References Cited

U.S. PATENT DOCUMENTS

| | | | |
|---|---|---|---|
| 2021/0183498 | A1 | 6/2021 | Kalafut et al. |
| 2021/0201145 | A1 | 7/2021 | Pham et al. |
| 2022/0095240 | A1 | 3/2022 | Ying et al. |
| 2022/0095379 | A1 | 3/2022 | Xiong et al. |
| 2022/0180767 | A1 | 6/2022 | Aharonson et al. |
| 2023/0178065 | A1* | 6/2023 | Murugesan ......... G10L 21/0364 704/260 |
| 2023/0252612 | A1 | 8/2023 | Ng et al. |
| 2023/0312481 | A1 | 10/2023 | Cole et al. |
| 2024/0161017 | A1 | 5/2024 | Pisner |
| 2024/0169251 | A1* | 5/2024 | Herard ................. G06N 3/0455 |
| 2025/0110700 | A1* | 4/2025 | Noble ....................... G06F 8/20 |
| 2025/0284828 | A1* | 9/2025 | Kallarakuzhi ........ H04L 63/102 |
| 2025/0328822 | A1* | 10/2025 | Mysore ............... G06F 11/3688 |

OTHER PUBLICATIONS

Sreeram R et al., "System and method for data content feature extraction and evaluation using a hybrid quantum and classical neural network", U.S. Appl. No. 18/930,578, filed Oct. 29, 2024.

* cited by examiner

SYSTEM AND METHOD FOR AUTOMATED COMPLIANCE ANALYSIS OF DIGITAL CONTENT

TECHNICAL FIELD

The present disclosure relates generally to digital content evaluation, and more specifically to a system and method for automated compliance analysis of digital content.

BACKGROUND

In software, web, and mobile applications, digital content (such as video, image, audio, and text) is presented to users to convey certain information. The digital content is subject to compliance guidelines to provide accessibility to disabled individuals.

SUMMARY

The disclosed system, described in the present disclosure, is particularly integrated into a practical application of improving the digital content compliance detection technology and digital content generation process. This practical application provides several technical advantages, including conserving computational and network resources that would otherwise be spent to render, revise, and communicate non-compliant digital content in a network.

In the realm of digital content development and creation, each digital content needs to follow specific compliance guidelines on how they should be designed and presented on a display screen. For example, digital content may be designed such that it is accessible and comprehendible to disabled individuals as defined in the compliance guidelines. As one example, in the case of an image, the image size, resolution, and contrast, each has a specific compliance guideline to comply with and follow as indicated in the compliance guidelines associated with images, such that the image is visible and comprehendible to visually impaired individuals. In another example, in the case of text, the font, font size, and text location on a user interface, each has a specific compliance guideline to comply with and follow as indicated in the compliance guidelines associated with text, such that the text is readable to visually-impaired individuals.

In conventional systems, the compliance checking process is a manual process done after the creation of the digital content. If corrections or adjustments need to be made to the digital content, the corrections and adjustments process will require additional processing resources to implement those corrections and adjustments. This also leads to delays in putting the digital content in production. Further, the conventional systems are not equipped with catching and addressing all of the non-compliant pieces of digital content before it is put in production (when the associated software/web application goes live and presented to users). Thus, in such cases, the software/web application is called back and has to go through corrections and revisions. This requires additional network and computational resources to be spent to facilitate the call back, corrections, and revisions of the software application. Further, if the non-compliant digital content is presented to disabled individuals, it limits the ability of those individuals to perform their desired task with respect to the software/web application. This, in turn, leads to poor user experience and further attempts to perform the tasks via the non-compliant digital content which leads to additional network resources being spent to process the repeated attempts.

The disclosed system is configured to provide a solution to these and other technical problems in the realm of digital content development and compliance detection, and non-compliant digital content mitigation technologies. The disclosed system obviates the need to spend additional processing resources to implement corrections and adjustments to the digital content and additional network resources to facilitate the deployment and call-back of the non-compliant digital content after it was put in production. The disclosed system provides several technical improvements to digital content compliance detection and generation process, and non-compliant digital content mitigation techniques. Some of these technical improvements are described below in conjunction with certain embodiments of the disclosed system.

In some embodiments, the disclosed system is configured to implement and train a machine learning algorithm to detect whether each digital content complies or meets its respective compliance guidelines. To this end, the machine learning algorithm may be trained by a training dataset that includes a set of digital content, each labeled with a respective compliance guideline and whether the digital content meets the respective compliance guideline. In the training phase, the machine learning algorithm learns the association and relationship between each digital content and its label. In the testing phase, the machine learning algorithm is given digital content without its label and is asked to predict whether the digital content complies with its respective compliance guidelines. Through the backpropagation process, the prediction accuracy of the machine learning algorithm is improved based on feedback and comparing the expected evaluation result with the prediction result of the machine learning algorithm. In this manner, the disclosed system performs proactive compliance detection on the digital content before it goes live via the network and addresses any non-compliant portions of the digital content. This, in turn, obviates the need to allocate network resources that would otherwise be spent on calling back and re-deploying a corrected version of the digital content.

In some embodiments, the disclosed system is configured to implement a hybrid quantum and classical neural network which includes a variational quantum circuit (VQC) layer for initial feature extraction, which encodes input data into a quantum state, followed by a classical convolutional neural network (CNN) for further processing and refining the extracted features of the digital content. In the variational quantum circuit layer, quantum circuits are configured to identify the relationships between the features of the digital content and identify features that are more indicative of the digital content to reduce the dimension of the feature vector representing the features of the digital content by removing features that are less indicative of the digital content. The feature vector with the reduced dimension is fed to the classical neural network to further narrow down the features to more relevant features of the digital content. This, in turn, reduces the computational complexity of evaluating the digital content in terms of complying with respective guidelines. This also obviates the need to allocate processing resources that would otherwise be spent on evaluating and analyzing less relevant features of the digital content.

The finalized feature vector may be evaluated by performing the reverse operations of the quantum convolutional neural network and classical convolutional neural network in an attempt to reconstruct the original input vector. The system may compare the generated output vector with the original input vector. If the generated output vector corresponds to the original input vector, the system may determine that the finalized feature vector accurately represents the digital content. Otherwise, the system may revise one or more parameters of one or both the quantum and classical neural network layers in one or more back propagations to improve the accuracy of the feature extraction process.

In some embodiments, the disclosed system is configured to implement a federated multi-modal neural network that is configured to determine whether each physical feature (represented as a first set of nodes in a knowledge graph) of the content data meets its respective compliance guideline (represented as a second set of nodes in a knowledge graph). The federated multi-modal neural network includes multiple transformers to process different types of digital content, e.g., image, text, audio, video, etc. The federated multi-modal neural network implements learnable activation functions on the relationship between each feature and its respective compliance evaluation indication. The learnable activation functions are dynamic as opposed to static activation functions in conventional neural network layers, to dynamically adjust the strength/confidence score of whether a feature of the digital content meets its respective compliance evaluation indication. This way, the federated multi-modal neural network learns the relationship between the nodes more effectively than the traditional transformers-which results in more accurate compliance evaluation results. This, in turn, improves the digital content compliance evaluation techniques by incorporating adaptive learning of how each type of digital content is assessed with respect to its guidelines, specifically in cases of varying upcoming changes in digital content and/or updated guidelines. By incorporating learnable activation functions, the disclosed system fine-tunes its evaluation metrics based on the given content and associated guidelines. This, in turn, obviates the need to train the algorithm from scratch for every new content type or updated compliance guideline requirement. Instead, the disclosed system dynamically adapts to changes in the new content type and/or updated guidelines to evaluate the content against the updated guidelines, e.g., during the evaluation process, without having been trained on the new content type and/or updated guidelines. Thus, the disclosed system conserves processing and memory resources that would otherwise be spent on training the algorithm on the new content type and/or updated compliance guidelines.

The disclosed system may provide feedback on the compliance evaluation results to the developers of the digital content at any stage, e.g., before, during, and/or after the development of the digital content. For example, the disclosed system may indicate compliant and non-compliant portions or features of the digital content in the evaluation result. Thus, this information may be used to proactively monitor and evaluate each digital content in terms of respective compliance guidelines-which leads to conserving additional computational and network resources that would otherwise be spent on rendering, revising, correcting, or communicating non-compliant digital content. This also reduces the delay in the content creation process and obviates the manual evaluation of the digital content. Further, the disclosed system improves the user experience of disabled individuals interacting with the software, web, or mobile application where the digital content is presented. For example, the disclosed system allows the presented digital content to meet the compliance guidelines. Thus, the disabled individuals can interact with the digital content more easily. This, in turn, reduces the amount of time that the disabled individual needs to spend on the platform (e.g., webpage) to perform tasks, as they no longer need to navigate non-compliant user interface elements or attempt multiple interactions with the non-compliant user interface elements to achieve their desired goal. Additionally, this leads to less back-and-forth network communication between a backend server hosting the webpage and the user devices where the disabled individuals are presented with the digital content because of the reduction in re-loading and re-rendering the whole content of the webpage with every attempt of the disabled individual to perform a task on the webpage followed by a failed attempt to perform the task and a re-loading request from the user device to the backend server.

Automated Compliance Analysis of Digital Content

In some embodiments, a system comprises a memory operably coupled with a processor. The memory is configured to store a compliance document associated with a first digital content, wherein the compliance document comprises text that indicates a first compliance guideline to present the first digital content. The processor is configured to access the first digital content comprising at least one of text, an image, an audio, or a video. The processor is further configured to extract a first set of features from the first digital content, wherein the first set of features comprises at least a physical attribute associated with the first digital content. The processor is further configured to extract a second set of features from the compliance document, wherein the second set of features comprises an indication of the first compliance guideline to present the first digital content. The processor is further configured to evaluate the first set of features against the second set of features. The processor is further configured to determine, based at least in part upon the evaluation of the first set of features against the second set of features, whether the first digital content meets the first compliance guideline. The processor is further configured to generate a feedback message that reflects the determination of whether the first digital content meets the first compliance guideline. The processor is further configured to output the generated feedback message.

Data content feature extraction and evaluation using a hybrid quantum and classical neural network.

In some embodiments, a system comprises a quantum convolutional network layer coupled with a processor. The quantum convolutional network layer comprising at least one quantum gate circuit configured to receive an input vector that represents a digital content, wherein the input vector comprises a set of numerical values. The at least one quantum gate circuit is further configured to generate a first quantum state vector for the input vector, wherein the first quantum state vector represents a set of features of the digital content in the form of a set of quantum bits. The set of features comprises at least a physical attribute associated with the digital content. The at least one quantum gate circuit is further configured to generate a second quantum state vector by performing a quantum convolution operation on the first quantum state vector, wherein the quantum convolution operation reduces a dimension of the first quantum state vector such that each local section of quantum bits within the first quantum state vector is represented by a single quantum bit in the second quantum state vector.

The processor is configured to receive the second quantum state vector from the quantum convolutional network layer. The processor is further configured to initiate a second feature vector by mapping each quantum bit within the second quantum state vector to a respective numerical value.

The processor is further configured to generate an output feature vector by performing a convolution operation on the second feature vector, wherein the convolution operation reduces a dimension of the second feature vector such that each local section of numbers within the second feature vector is represented by a single number in the output feature vector. The processor is further configured to evaluate the output feature vector by comparing the output feature vector with an expected vector. The processor is further configured to determine that the output feature vector corresponds to the expected vector. The processor is further configured to determine that the output feature vector represents the digital content in response to determining that the output feature vector corresponds to the expected vector.

Multi-Modal Data Processing with Federated Learning Neural Networks

In some embodiments, a system comprises a memory operably coupled with a processor. The memory is configured to store a compliance document associated with digital content, wherein the compliance document comprises text that indicates a set of compliance guidelines to present the digital content. The processor is configured to receive an input feature vector associated with the digital content, wherein the input feature vector comprises a set of numerical values that represent at least one physical feature of the digital content and a respective evaluation result against the set of compliance guidelines. The processor is further configured to generate a knowledge graph comprising a set of nodes, wherein the set of nodes comprises a first node and a second node. The first node represents a first physical feature associated with the digital content. The second node represents a first compliance guideline associated with the first physical feature. The first node is linked to the second node by an edge. The edge represents a relationship resulting in an evaluation result that indicates whether the first physical feature meets the first compliance guideline. The processor is further configured to adjust, based at least in part upon the evaluation result, a weight value associated with the edge between the first node and the second node, wherein the adjusted weight value reflects a confidence score of the first physical feature meeting the first compliance guideline. The processor is further configured to determine, based at least in part upon the adjusted weight value, whether the digital content meets the first compliance guideline. The processor is further configured to generate a feedback message that reflects the determination of whether the digital content satisfies the first compliance guideline. The processor is further configured to output the generated feedback message.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to implement a reliable compliance analysis of digital content. Embodiments of the present disclosure and its advantages may be understood by referring to FIGS. 1 through 7. FIGS. 1 through 7 are used to describe systems and methods to implement a reliable compliance analysis of digital content, according to some embodiments.

System Overview

Figure 1:
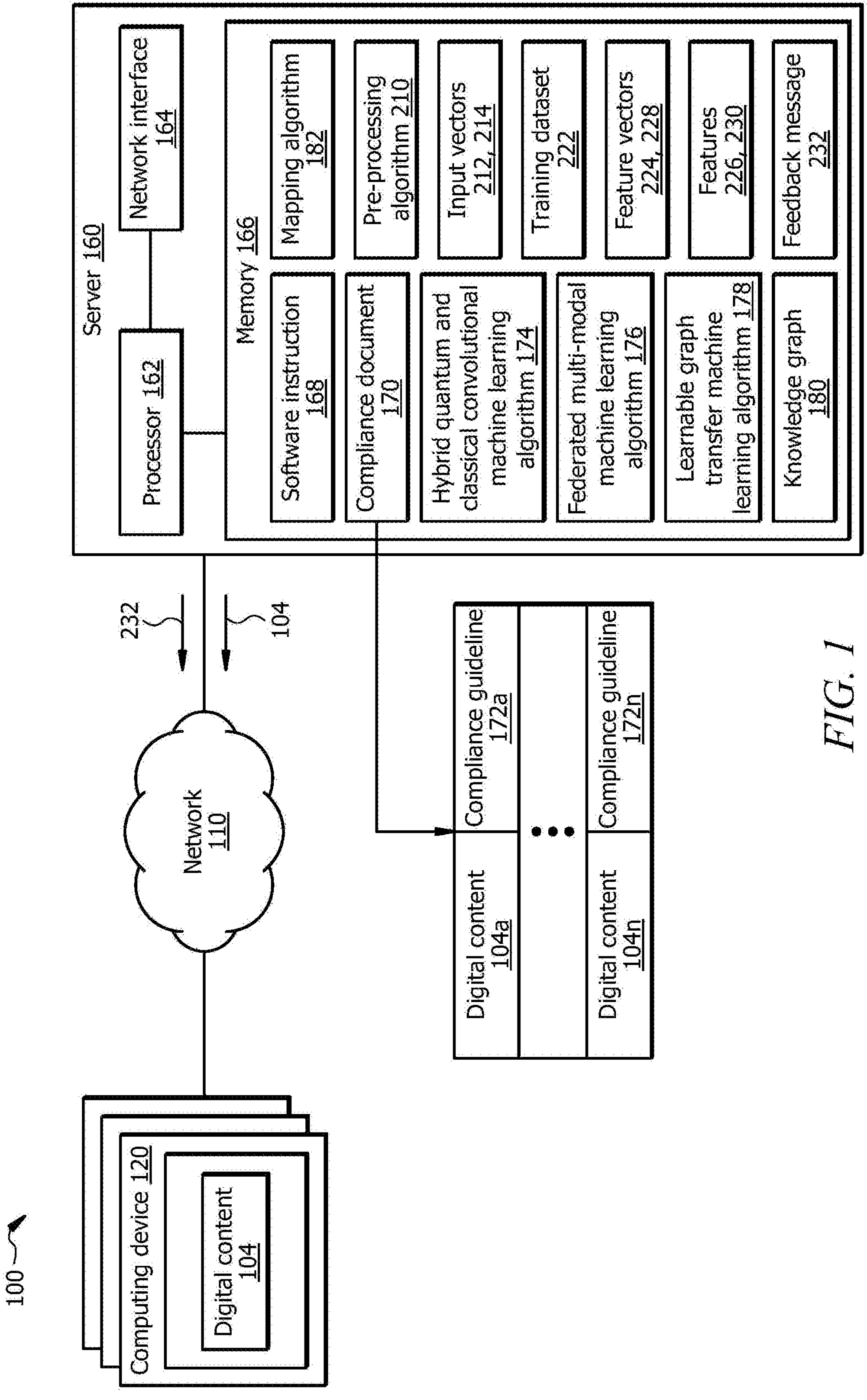
FIG. 1 illustrates an embodiment of a system configured to detect whether digital content meets respective compliance guidelines.

FIG. 1 illustrates an embodiment of a system 100 that is generally configured to implement unsupervised machine learning algorithms to detect whether digital content meets respective compliance guidelines (e.g., American Disability Act (ADA) guidelines and the like). In some embodiments, the system 100 comprises a server 160 communicatively coupled with one or more computing devices 120 via a network 110. The network 110 enables the communication among the components of the system 100. Users may use the computing devices 120 to access digital content 104, such as webpages, images, audio files, video files, text, web applications, software applications, mobile applications, and the like. The server 160 is configured to evaluate each digital content 104 and determine whether it complies with respective compliance guidelines 172. In other embodiments, the system 100 may not have all of the components listed and/or may have other elements instead of, or in addition to, those listed above.

In general, the system 100 improves the digital content compliance detection technology and digital content generation process. In the realm of digital content development and creation, each digital content 104 needs to follow specific compliance guidelines 172 on how to design and present them. For example, digital content 104 may be designed such that it is accessible and comprehendible to disabled individuals as defined in the compliance guidelines 172. For example, in case of an image, the image size, resolution, and contrast, each has a specific compliance guideline 172 to comply with and follow as indicated in the compliance guidelines 172 associated with images, such that the image is visible and comprehendible to visually-impaired individuals. In another example, in the case of text, the font, font size, and location, each has a specific compliance guideline 172 to comply with and follow as indicated in the compliance guideline 172 associated with text, such that the text is readable to visually-impaired individuals.

In conventional systems, the compliance checking process is done manually as feedback after the creation of the digital content 104. If corrections or adjustments need to be made to the digital content 104, the corrections and adjustments process will require additional processing resources to be implemented. This also leads to delays in putting the digital content 104 in production.

The disclosed system 100 is configured to provide a solution to these and other technical problems in the realm of digital content development and digital content compliance detection technologies. The disclosed system 100 obviates the need to spend additional processing resources to implement corrections and adjustments to the digital content 104.

The disclosed system 100 provides several technical improvements to digital content compliance detection technology and digital content generation process. Some of these technical improvements are described below in conjunction with certain embodiments of the disclosed system. In some embodiments, the disclosed system 100 is configured to implement and train a machine learning algorithm to detect whether each digital content 104 complies or meets its respective compliance guideline 172. To this end, the machine learning algorithm 220 may be trained by a training dataset 222 that includes a set of digital content 104, each labeled with a respective compliance guideline 172, and whether the digital content 104 meets the respective compliance guideline 172. In the training phase, the machine learning algorithm 220 learns the association and relationship between each digital content 104 and its label. In the testing phase, the machine learning algorithm 220 is given digital content 104 without its label and is asked to predict whether the digital content 104 complies with its respective compliance guideline 172. Through the backpropagation process, the prediction accuracy of the machine learning algorithm 220 is improved based on feedback and comparing the expected evaluation result with the prediction result of the machine learning algorithm 220.

In some embodiments, the disclosed system 100 is configured to implement a hybrid quantum and classical neural network which includes a variational quantum circuit (VQC) layer for initial feature extraction, which encodes input data into a quantum state, followed by a classical convolutional neural network (CNN) for further processing and refining the extracted features of the digital content 104. In the variational quantum circuit layer, quantum circuits are configured to identify the relationships between the features 226 of the digital content 104 and identify features 226 that are more indicative of the digital content 104 to reduce the dimension of the feature vector 224 representing the features of the digital content 104 by removing features 226 that are less indicative of the digital content 104. The feature vector 224 with the reduced dimension would be fed to the classical neural network to further narrow down the features to more relevant features of the digital content 104.

The finalized feature vector 224 may be evaluated by performing the reverse operations of the quantum convolutional neural network and classical convolutional neural network in an attempt to reconstruct the original input vector 212. The system 100 may compare the generated output vector 430 with the original input vector 212. If the generated output vector 430 corresponds to the original input vector 212, the system 100 may determine that the finalized feature vector 224 accurately represents the digital content 104. Otherwise, the system 100 may revise one or more parameters of one or both the quantum and classical neural network layers in one or more backpropagations to improve the accuracy of the feature extraction process.

In some embodiments, the disclosed system 100 is configured to implement a federated multi-modal neural network that is configured to determine whether each physical feature 226 (represented as a first set of nodes in a knowledge graph 180) of the content 104 meets its respective compliance guideline 172 (represented as a second set of nodes in a knowledge graph 180). The federated multi-modal neural network includes multiple transformers to process different types of digital content 104, e.g., image, text, audio, video, etc. The federated multi-modal neural network implements learnable activation functions on the relationship between each feature and its respective compliance evaluation indication. The learnable activation functions are dynamic as opposed to static activation functions in conventional neural network layers, to dynamically adjust the strength/confidence score of whether a feature of the digital content 104 meets its respective compliance evaluation indication. This way the federated multi-modal neural network learns the relationship between the nodes more effectively than the traditional transformers-which results in more accurate compliance evaluation results.

The disclosed system 100 may provide feedback on the compliance evaluation results to the developers of the digital content 104, e.g., before, during, and/or after the development of the digital content 104. For example, the disclosed system 100 may indicate compliant and non-compliant portions or features 226 of the digital content 104 in the evaluation result. Thus, this information may be used to proactively monitor and evaluate each digital content 104 in terms of respective compliance guidelines 172-which leads to conserving additional computational resources that would otherwise be spent on rendering, revising, correcting, or communicating non-compliant digital content 104. This also reduces the delay in the content creation process and obviates the manual evaluation of the digital content 104. Further, the disclosed system improves the user experience of disabled individuals interacting with the software, web, or mobile application where the digital content is presented. For example, the disclosed system allows the presented digital content to meet the compliance guidelines. Thus, the disabled individuals can interact with the digital content more easily.

System Components

Network

Network 110 may be any suitable type of wireless and/or wired network. The network 110 may be connected to the Internet or a public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., Wi-Fi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may include fiber optics, optical fibers, and the like to implement quantum communication channels. The network 110 may be configured to support any suitable type of communication protocol as would be appreciated by one of ordinary skill in the art.

Example Computing Device

Each computing device 120 may generally be any device that is configured to process data and interact with users. Examples of the computing device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IOT) device, or any other suitable type of device. The computing device 120 may include a user interface, such as a display, a microphone, a camera, a keypad, or other appropriate terminal equipment usable by users.

Each computing device 120 may include a hardware processor, memory, and/or circuitry configured to perform any of the functions or actions of the computing device 120 described herein. For example, the computing device 120 includes a processor in signal communication with a network interface and a memory. The memory stores software instructions (e.g., code) that, when executed by the processor, cause the processor to perform one or more operations of the computing device 120 described herein. The user may use the computing device 120 to access digital content 104 on the display screen 122 of the computing device 120. In some examples, the digital content 104 may include any content that users can interact with, including but not limited to, components of software/web/mobile applications, web pages, text, images, video files, and audio files, among other multimedia items that are subject to compliance guidelines 172's indications.

Example Server

The server 160 generally includes a hardware computer system configured to implement machine learning algorithms to detect whether digital content meets respective compliance guidelines. In certain embodiments, the server 160 may be implemented by a cluster of computing devices, such as virtual machines. For example, the server 160 may be implemented by a plurality of computing devices using distributed computing and/or cloud computing systems in a network. In certain embodiments, the server 160 may be configured to provide services and resources (e.g., data and/or hardware resources as described herein, etc.) to other components and devices.

The server 160 may comprise a processor 162 operably coupled with a network interface 164 and a memory 166. The processor 162 comprises one or more processors. The processor 162 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 162 may be a programmable logic device, a microcontroller, a microprocessor, or any suitable number and combination of the preceding. The one or more processors are configured to process data and may be implemented in hardware or software. For example, the processor 162 may be 8-bit, 16-bit, 32-bit, 64-bit, or of any other suitable architecture. The processor 162 may include an arithmetic logic unit (ALU) for performing arithmetic and logic operations. The processor 162 may register the supply operands to the ALU and store the results of ALU operations. The processor 162 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 128) to perform the operations of the computing device 120 described herein. In this way, the processor 162 may be a special-purpose computer designed to implement the functions disclosed herein. In an embodiment, the processor 162 is implemented using logic units, FPGAs, ASICs, DSPs, or any other suitable hardware. The processor 162 is configured to operate as described in FIGS. 1-7. For example, the processor 162 may be configured to perform one or more operations of the operational flow 200 as described in FIG. 2, one or more operations of the method 300 as described in FIG. 3, one or more operations of the operational flow 400 as described in FIGS. 4A and 4B, one or more operations of the method 500 as described in FIG. 5, one or more operations of the operational flow 600 as described in FIG. 6, and one or more operations of the method 700 as described in FIG. 7.

The network interface 164 is configured to enable wired and/or wireless communications. The network interface 164 may be configured to communicate data between the server 160 and other devices, systems, or domains. For example, the network interface 164 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 162 may be configured to send and receive data using the network interface 164. The network interface 164 may be configured to use any suitable type of communication protocol.

The memory 166 may be a non-transitory computer-readable medium. The memory 166 may be volatile or non-volatile and may comprise read-only memory (ROM), random-access memory (RAM), ternary content-addressable memory (TCAM), dynamic random-access memory (DRAM), and/or static random-access memory (SRAM). The memory 166 may include one or more of a local database, a cloud database, a network-attached storage (NAS), etc. The memory 166 comprises one or more disks, tape drives, or solid-state drives, and may be used as an overflow data storage device, to store programs when such programs are selected for execution, and to store instructions and data that are read during program execution. The memory 166 may store any of the information described in FIGS. 1-7 along with any other data, instructions, logic, rules, or code operable to implement the function(s) described herein when executed by processor 162. For example, the memory 166 may store software instructions 168, compliance documents 170, features 226, 230, feature vectors 224, 228, quantum mapping algorithms 182, feedback messages 232, training datasets 222, pre-processing algorithms 210, hybrid quantum and classical convolutional machine learning algorithms 174, federated multi-modal machine learning algorithms 176, learnable graph transformer machine learning algorithms 178, knowledge graphs 180, input vectors 212, 214, and/or any other data or instructions. The software instructions 168 may comprise any suitable set of instructions, logic, rules, or code operable to execute the processor 162 and perform the functions described herein, such as some or all of those described in FIGS. 1-7.

The compliance document 170 may include text, images, videos, etc. that indicate compliance guidelines 172 on how to present each digital content 104. For example, the compliance guidelines 172 may be related to accessibility, content presentation standards, and other regulatory requirements, among others. The compliance document 170 may indicate that the digital content 104*a* needs to meet the compliance guidelines 172*a*, and digital content 104*n* needs to meet the compliance guidelines 172*n*. In some examples, the compliance guidelines 172 may include rules for image size, image resolution, image contrast, image colors, text font size, text color, audio volume, video resolution, video size, and video contrast, among others.

The hybrid quantum and classical convolutional machine learning algorithm 174 may be implemented by the processor 162 executing software instructions 168 and is generally configured to extract features from digital content 104 and validate the extracted features via variational quantum circuit layers and classical convolutional neural network layers. The hybrid quantum and classical convolutional machine learning algorithm 174 is described in greater detail in conjunction with FIGS. 4A and 4B. The corresponding description below is a brief description of the hybrid quantum and classical convolutional machine learning algorithm 174. The hybrid quantum and classical convolutional machine learning algorithm 174 may comprise variational quantum circuit layers and classical convolutional neural network layers. The variational quantum circuit layers may include a series of quantum circuits configured to process quantum bits representing a feature vector associated with the digital content 104. The classical convolutional neural network layers may be implemented by a support vector machine, random forest, image processing algorithm, text processing algorithm, video processing algorithm, audio processing algorithm, etc. The classical convolutional neural network layers may be implemented by a plurality of augmented neural network layers, neural network layers, convolutional neural network layers, and the like. In some examples, the hybrid quantum and classical convolutional machine learning algorithm 174 may be implemented by a combination of deep learning architectures and neural networks for feature extraction and other operations. The quantum mapping algorithm 182 may be implemented by the processor 162 executing software instructions 168. The quantum mapping algorithm 182 may be a part of the hybrid quantum and classical convolutional machine learning algorithm 174. The quantum mapping algorithm 182 is configured to translate quantum bits to classical numerical values (in the form of bits and/or natural numbers), and vice versa.

The federated multi-modal machine learning algorithm 176 may be implemented by the processor 162 executing software instructions 168 and is generally configured to process and analyze multiple types of digital content 104 across distributed environments by employing a federated learning framework. The federated multi-modal machine learning algorithm 176 is described in greater detail in conjunction with FIG. 6. The corresponding description below is a brief description of the federated multi-modal machine learning algorithm 176. The federated multi-modal machine learning algorithm 176 enables the processing of digital content 104 such as text, images, audio, and video, each represented by distinct feature vectors and associated with different compliance guidelines 172. The federated multi-modal machine learning algorithm 176 may be implemented by an image processing algorithm, text processing algorithm, video processing algorithm, audio processing algorithm, support vector machine, random forest, etc. The federated multi-modal machine learning algorithm 176 may be implemented by a plurality of augmented neural network layers, neural network layers, convolutional neural network layers, decoders, encoders, transformers, and the like. The federated multi-modal machine learning algorithm 176 implements a Kolmogorov-Arnold Network (KAN)-based architecture and replaces traditional fully connected layers with learnable activation functions on the edges of a knowledge graph. In this way, the federated multi-modal machine learning algorithm 176 implements dynamic adjustment of the weight values associated with confidence scores of relationships between the features of the digital content 104 and their respective compliance guidelines 172. The federated multi-modal machine learning algorithm 176 aggregates the confidence scores and determines the overall compliance evaluation of the digital content 104.

The learnable graph transformer machine learning algorithm 178 may be implemented by the processor 162 executing software instructions 168 and is generally configured to generate the knowledge graph 180. The learnable graph transformer machine learning algorithm 178 is described in greater detail in conjunction with FIG. 6. The corresponding description below is a brief description of the learnable graph transformer machine learning algorithm 178. The learnable graph transformer machine learning algorithm 178 may be implemented by a plurality of hierarchical multi-head attention network layers with graph convolutional network layers, augmented neural network layers, neural network layers, convolutional neural network layers, decoders, encoders, transformers, and the like. The learnable graph transformer machine learning algorithm 178 may generate the knowledge graph 180 by ingesting feature vectors representing features/attributes of the digital content 104 and their associated compliance guidelines 172. The learnable graph transformer machine learning algorithm 178 may generate the knowledge graph 180 that includes nodes and edges. A portion of the nodes represents the features of the digital content 104 and another portion of nodes represents the respective compliance guidelines 172 of the features of the digital content 104. The edges represent the relationship between the nodes. These relationships are evaluated using multi-head attention mechanisms, and the learnable graph transformer machine learning algorithm 178 dynamically identifies which feature 226 (node) is associated with which compliance guideline 172 (node) by indicating a line (edge) between the nodes. The learnable graph transformer machine learning algorithm 178 may implement graph convolutional networks to aggregate information from neighboring nodes to identify the latent linkages and dependencies among the nodes. In this way, the learnable graph transformer machine learning algorithm 178 learns which feature (node) is associated with which compliance guideline 172 (node).

The knowledge graph 180 may include a set of nodes representing features of the digital content 104 and corresponding compliance guideline 172, and edges representing the relationship of each feature of the digital content 104 with its respective compliance guideline 172. The edges in the knowledge graph 180 are represented by lines connecting respective nodes. The knowledge graph 180 is constructed by establishing edges that connect nodes representing features 226 of the digital content 104 to nodes representing respective compliance guidelines 172. The edges are weighted based on evaluation results that indicate whether the feature 226 of the digital content 104 complies with its associated compliance guideline 172.

The pre-processing algorithm 210 may be implemented by the processor 162 executing the software instructions 168 and is generally configured to normalize and standardize the input data including digital content 104, compliance document 170, and the training dataset 222 to have consistent input formats across various data types. For example, the processing algorithm 210 may normalize and standardize digital content 104, according to pre-configured rules and formats, to have consistent input formats across various data types such as text, images, audio, or video.

Operational Flow for Automated Compliance Analysis of Digital Content

Figure 2:
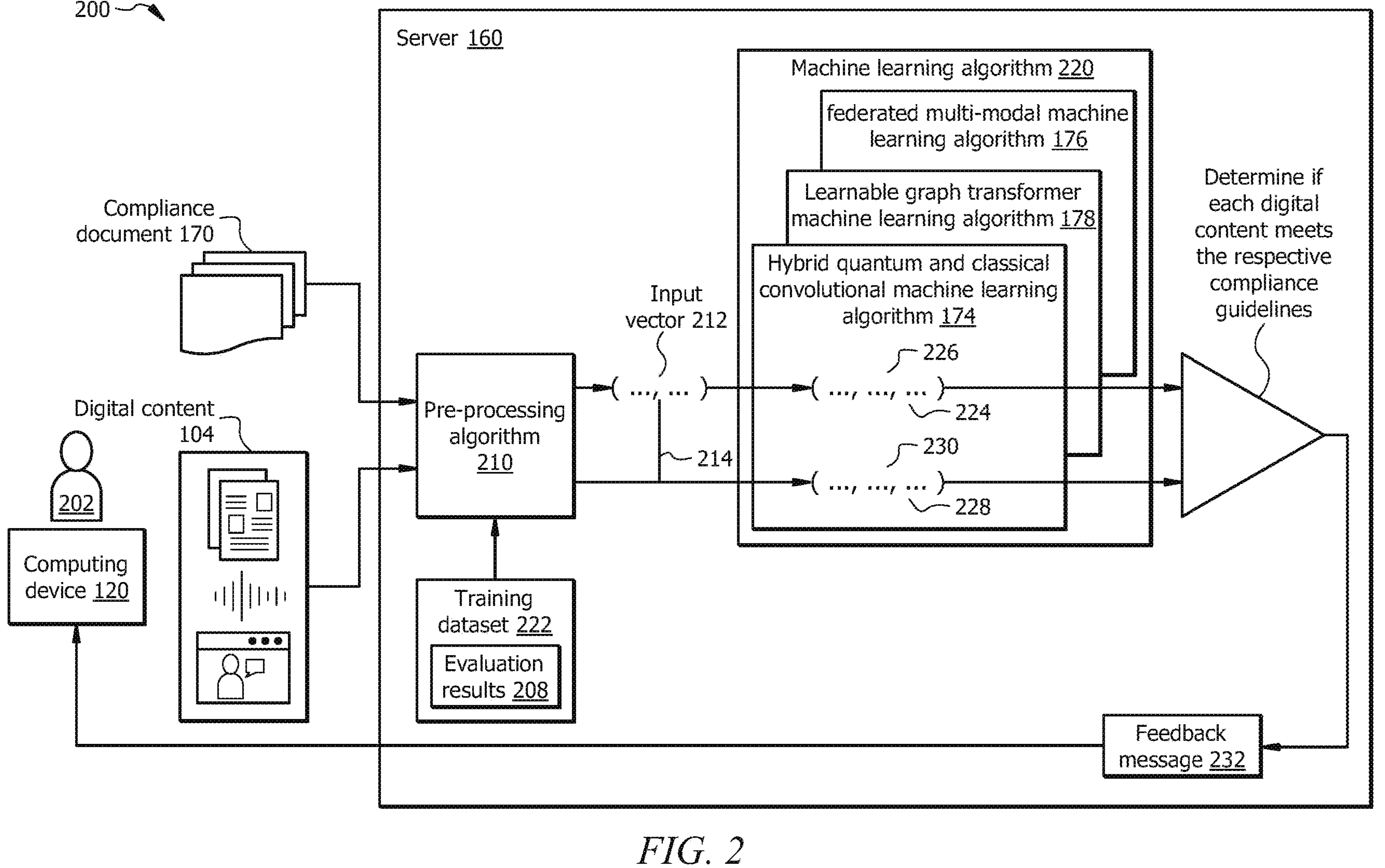
FIG. 2 illustrates an example operational flow of the system of FIG. 1 to implement an automated compliance analysis of digital content.

FIG. 2 illustrates an example operational flow 200 of system 100 (see FIG. 1) to implement the automated compliance analysis of digital content 104. The operational flow 200 may begin when the digital content 104 is accessed by the server 160. The digital content 104 may include the content of software/web/mobile applications associated with an organization. For example, the digital content 104 may be accessed by the server 160 periodically access the digital content 104 for evaluation (e.g., every day, every few minutes, etc.) and/or on demand.

The digital content 104 may be evaluated before the production of the software/web/mobile applications to avoid delays caused by potential corrections or adjustments. The server 160 accesses the compliance document 170 which may include text, image, and/or other types of data to indicate the rules for presenting each digital content 104.

The compliance document 170 and the digital content 104 are processed and analyzed by the server 160 (e.g., via the hybrid quantum and classical convolutional machine learning algorithm 174, learnable graph transformer machine learning algorithm 178, and the federated multi-modal machine learning algorithm 176). The hybrid quantum and classical convolutional machine learning algorithm 174, learnable graph transformer machine learning algorithm 178, and the federated multi-modal machine learning algorithm 176 may be portions of the machine learning algorithm 220. The machine learning algorithm 220 may be trained by the training dataset 222. The training dataset 222 may include a set of digital content 104, each labeled with a respective compliance guideline 172 and whether the historical digital content 104 meets the respective compliance guideline 172 (e.g., evaluation results 208 of each historical digital content 104 meeting the respective compliance guideline 172). The training dataset 222 may include a set of digital content 104, each labeled with a respective feature vector that includes numerical values indicating the physical features of digital content 104.

In the training phase, the machine learning algorithm 220 learns the association and relationship between each digital content 104 and its label. The machine learning algorithm 220 may process the labeled feature vectors from the training dataset 222 to learn how to map each physical feature of the digital content 104 to its respective compliance guideline 172 and whether a given physical feature of the digital content 104 meets its respective compliance guideline 172. The machine learning algorithm 220 may adjust the parameters of its neural network layers (such as weight and bias values) and parameters of its quantum circuits (such as current fed to the quantum gates and rotation factors for polarization of quantum bits) to establish the feature and compliance guidance mapping.

In the testing phase, the machine learning algorithm 220 is given digital content 104 without its label and is asked to predict whether the digital content 104 complies with its respective compliance guideline 172. Through the iterative backpropagation process, the prediction accuracy of the machine learning algorithm 220 is increased based on feedback and comparing the expected evaluation result (indicated in the training dataset 222) with the compliance prediction result of the machine learning algorithm 220.

Pre-Processing

The server 160 may perform the pre-processing operation by executing the pre-processing algorithm 210 on the compliance document 170, the digital content 104, and evaluation results 208. The pre-processing algorithm 210 may be implemented by software instructions 168 that include image-processing neural networks, text-processing neural networks, audio-processing neural networks, video-processing neural networks, and the like. The evaluation results 208 may include information indicating whether each digital content 104 meets its respective compliance guideline 172.

In some embodiments, the pre-processing operation may include normalizing and standardizing the digital content 104 to have consistent input formats across various data types such as text, images, audio, or video. For example, for images, the pre-processing operation may include resizing images to have a consistent input size, The pixel values of the images may be normalized to a specific range, such as [0, 1] or [−1, 1], e.g., to speed up convergence during training. Additionally, the pre-processing operation may include undergoing color space conversion for images to convert the images to the unified color scheme, such as red-green, blue (RGB), grayscale, or others, depending on the machine learning algorithm 220 requirements. To reduce overfitting, data augmentation techniques, such as random cropping, rotation, flipping, brightness and contrast adjustments, zooming, and shearing may be applied in pre-processing operations to generate a set of augmented versions of the input.

In some embodiments, the images may be standardized to implement that images have a mean value of zero and a standard deviation value of one. In some embodiments, cropping and padding may be used to focus on regions of interest while maintaining the image's aspect ratio for processing at specific input sizes. The image data may be converted to a float32 data type and checked for correct channel handling, such as checking if the image contains the expected number of channels, such as three for RGB images. In some embodiments, for text data, the pre-processing operation may include tokenization to split the input text into smaller components, followed by vocabulary creation, which maps each unique token to a numeric identifier. This process may include generating word embedding which associates each word with a vector representation. In some embodiments, for audio data and audio re-sampling facilities, all audio samples are at the same frequency range, and audio filtering may be applied to limit audio samples to a fixed duration to allow consistency in the input data. The audio data may be transformed into Mel-spectrograms, which plot the frequency content of the signal over time, e.g., using a Mel scale to allow consistency in the input data.

The pre-processing operation includes processing and analyzing the compliance document 170 and evaluation results 208, e.g., by implementing an image processing neural network, text processing neural network, audio processing neural network, video processing neural network, and the like. In some embodiments, the compliance document 170, design validation process and historical design artifacts (e.g., digital content 104) that were evaluated by users or the server 160, along with corresponding evaluation results 208 are collected, analyzed, and normalized by the processing algorithm 210 and outputted as input vectors 212. The input vectors 212 include standardized and structured representations of the digital content 104, historical design artifacts, and their compliance evaluation results 208.

The input vectors 212 may be provided to the hybrid quantum and classical convolutional machine learning algorithm 174.

The hybrid quantum and classical convolutional machine learning algorithm 174 generates and validates a feature vector 224 associated with the respective digital content 104. The operation of the hybrid quantum and classical convolutional machine learning algorithm 174 is described in greater detail in FIGS. 4A and 4B. In brief, the hybrid quantum and classical convolutional machine learning algorithm 174, via a first quantum convolutional layer and a first classical convolutional neural network layer, may extract a first set of features 226 from the input vector 212, where the features 226 may indicate physical attributes of the digital content 104, such as the content of the digital content 104, text size, color contrast, pixel information, audio clarity, video contrast, among others. The output of this process may be a feature vector 224 with reduced dimension compared to the input vector 212.

The hybrid quantum and classical convolutional machine learning algorithm 174 may preform reverse operations by a second quantum convolutional layer and a second classical de-convolutional neural network layer on the feature vector 224 in an attempt to reach or reproduce the original input vector. The output of this process is a second output vector 430 (see FIG. 4A).

Figure 4A:
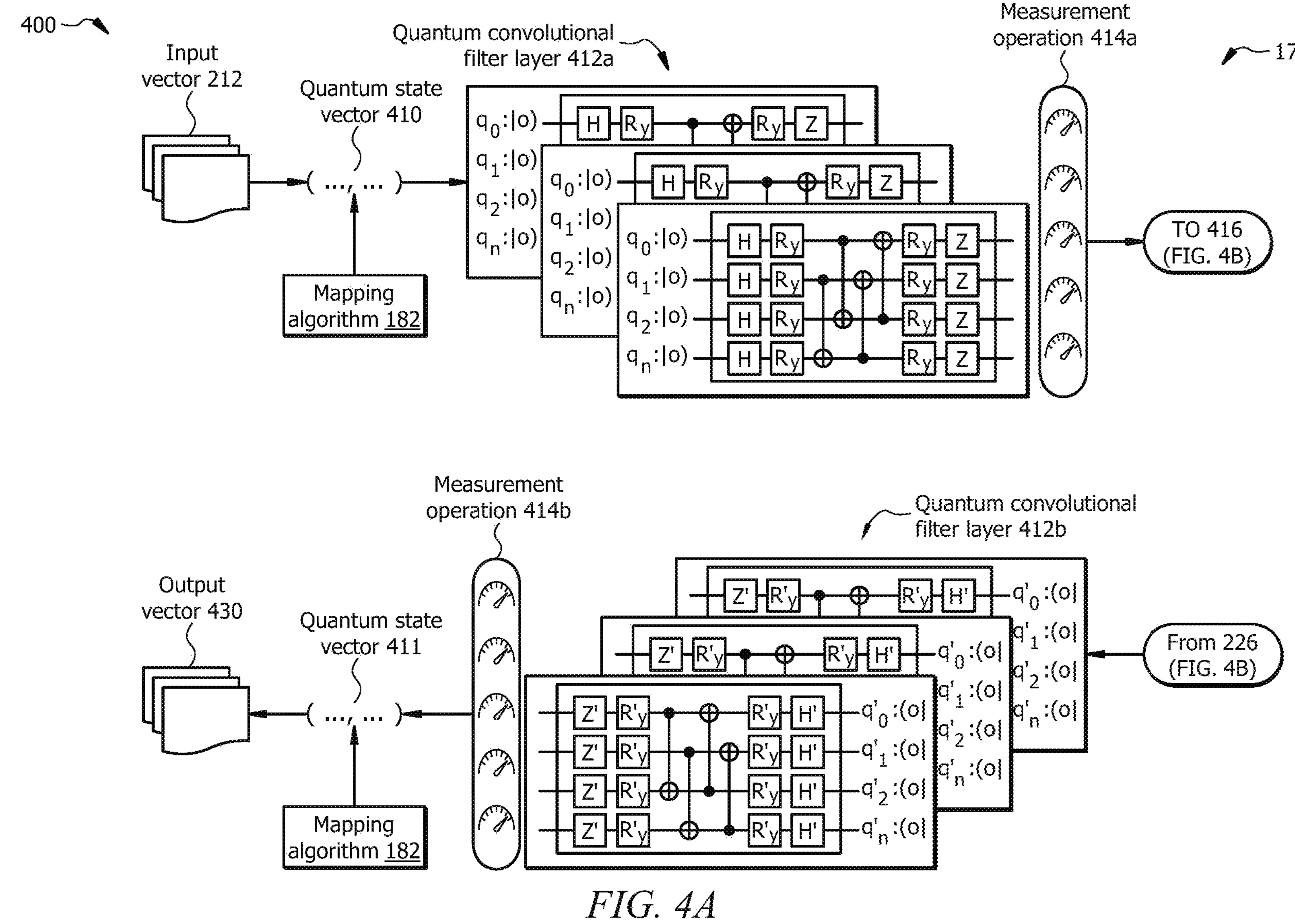
FIGS. 4A and 4B illustrate an example operational flow of the system of FIG. 1 for feature extraction and evaluation by a hybrid quantum and classical convolutional machine learning algorithm.

The hybrid quantum and classical convolutional machine learning algorithm 174 may compare the input vector 212 with the output vector 430 (see FIG. 4A). If the input vector 212 corresponds to the output vector 430 (see FIG. 4A), the hybrid quantum and classical convolutional machine learning algorithm 174 may determine that the feature vector 224 accurately and/or sufficiently represents the digital content 104. Similarly, the hybrid quantum and classical convolutional machine learning algorithm 174 may evaluate whether the analysis and feature extraction of each of the digital content 104, compliance document 170, and the evaluation results 208 is accurate. For example, the hybrid quantum and classical convolutional machine learning algorithm 174 may perform similar operations to evaluate a first feature vector 224 that represents digital content 104, a second feature vector 224 that represents compliance guideline 172, and a third feature vector 224 that represents the evaluation results 208 of historical compliance evaluations of training digital content 104. In the same or another example, different portions of the feature vector 244 may represent digital content 104, compliance document 170, and the evaluation results 208.

In this manner, the server 160, e.g., via the hybrid quantum and classical convolutional machine learning algorithm 174 validates the feature extraction process of the input data. Thus, the server 160 may extract the first set of features 226 from (at least) the digital content 104 to generate the feature vector 224. The features 226 may be represented by the feature vector 224 which includes a first set of numerical values. In some embodiments, a portion of the input vector 212 (e.g., vector 214) that represents the compliance document 170 and evaluation results 208 of each historical digital content 104 may be used to extract features 230 from the respective compliance document 170 and historical evaluation results 208 by the machine learning algorithm 220.

The server 160 (e.g., via the machine learning algorithm 220) may extract the second set of features 230 from the compliance document 170 represented in the input vector 214. The features 230 may be represented by the feature vector 228 which includes a second set of numerical values. The features 230 may include an indication of the compliance guideline 172 (e.g., compliance guideline 172*a*) to present the digital content 104 (e.g., digital content 104*a*)—to be followed when presenting the digital content 104, e.g., displayed on a display screen (in the case of text, video, and/or image), sent to a microphone to be uttered (in the case of audio).

Evaluating the Digital Content Against a Respective Compliance Guideline

The server 160, via the machine learning algorithm 220 may evaluate the feature vector 224 representing the features 226 against the feature vector 228 representing the features 230. In this process, the server 160 may implement the learnable graph transformer machine learning algorithm 178 and federated multi-modal machine learning algorithm 176. For example, the server 160, e.g., via the learnable graph transformer machine learning algorithm 178, may generate a knowledge graph in which nodes represent the extracted features 226 of the digital content 104 and the compliance guidelines 172, and edges represent the relationships leading to evaluation results 208 between the features 226 and compliance guidelines 172. The server 160, e.g., via the learnable graph transformer machine learning algorithm 178, may generate, based on the feature vectors 224 and 228, a knowledge graph that comprises each digital content 104 (as a node) linked with the respective compliance guideline 172 by a line that represents relationship between the digital content and the respective compliance guideline denoting a validation result 208 of the digital content 104 satisfying the respective compliance guideline 172.

The server 160 may determine whether each digital content 104 meets the respective compliance guideline 172 based on the validation result 208. The server 160, e.g., via the federated multi-modal machine learning algorithm 176, processes various types of the digital content 104 (e.g., text, images, audio, video) to evaluate each of them against the respective compliance guidelines 172. In this manner, the server 160 may evaluate the digital content 104 against its respective compliance guideline 172 by comparing its feature vector 224 to the compliance guideline's feature vector 228. In response, the server 160, e.g., via the machine learning algorithm 220, determines if the attributes of the digital content 104, such as layout, accessibility features, visual elements, etc. comply with the specified respective compliance rules. Based on the evaluation of the feature vector 224 with feature vector 228, the server 160 may determine whether the digital content 104 satisfies, meets, or complies with the respective compliance guideline 172.

To this end, the machine learning algorithm 220 may use the training from the training dataset 222 to adjust its parameters (e.g., bias and weight values of neural networks, parameters of the quantum convolutional layer, etc.) and improve the compliance evaluation process of the machine learning algorithm 220. During training, the machine learning algorithm 220 learns to associate feature patterns in the digital content 104 with the corresponding compliance guidelines 172 and their evaluation results 208. Using the learned association or relationship, the machine learning algorithm 220 may produce predictions during real-time compliance evaluation of digital content 104 and determine whether new digital content 104 complies with respective guidelines 172 based on learned patterns. In response, the server 160, e.g., via the machine learning algorithm 220, may generate a feedback message 232 that reflects the determination of whether the digital content 104 meets the respective compliance guideline 172.

The server 160 may output or provide the feedback message 232, e.g., to developers 202 via computing devices 120. If it is determined that the digital content 104 does not meet at least a portion of its respective compliance guideline 172, the feedback message 232 may include an updated version of the digital content 104 that complies with the respective compliance guideline 172, e.g., the updated version of the digital content 104 with adjusted or modified features (that was determined to be non-compliant), such as resized text content, increased color contrast in image content, etc. The feedback message 232 may include suggestive instructions that indicate to implement the updated version of the digital content 104. The feedback message 232 may include a visual representation of the digital content 104 (in the case of an image, text, and/or video frames) in which one or more non-compliant features 226 and corresponding one or more suggested updates are highlighted. This way, the developers 202 may follow the instructions and indications provided in the feedback message 232 to implement the adjustments, before, during, and/or after the content development. In some embodiments, the server 160 may use the learned compliance analysis to generate and render compliant digital content 104 by generative machine learning algorithms, such as adjusting images and videos to meet color contrast guidelines, and adjusting text to comply with font size guidelines, among others. In this process, the server 160 may use feedback from the evaluation of the digital content, where non-compliant features, such as text that is too small or images with low contrast, are flagged. The server 160 may adjust or reconstruct the content 104 by incorporating design elements and configurations that meet the respective compliance guidelines 172. For example, the server 160 may increase font size, increase color contrast of images/videos, and add alternative text descriptions for images, among others. The server 160 may render the updated digital content 104 and deploy it in the network. In another example, the server 160 may generate and render requested types of content 104 according to the compliance guidelines 172 from the outset.

Figure 3:
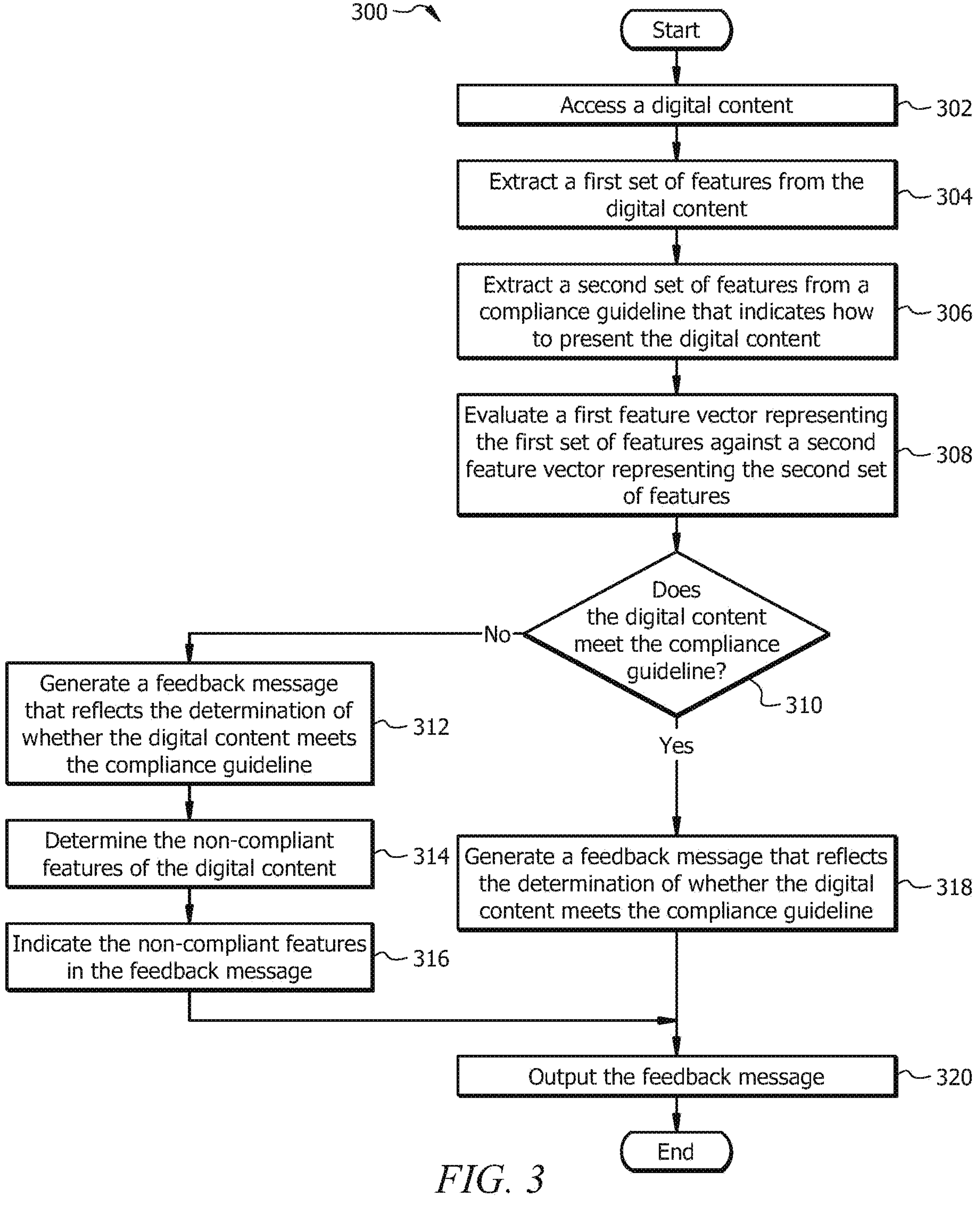
FIG. 3 illustrates an example flow chart of a method of the system of FIG. 1 to implement an automated compliance analysis of digital content.

Example Method to Implement the Automated Compliance Analysis of Digital Content FIG. 3 illustrates an example flowchart of a method 300 to implement the automated compliance analysis of digital content 104, according to some embodiments. Modifications, additions, or omissions may be made to method 300. The method 300 may include more, fewer, or other operations. For example, operations may be performed in parallel or in any suitable order. While at times it is discussed that the system 100, computing devices 120, server 160, or components of any thereof perform some operations, any suitable system or components of the system may perform one or more operations of the method 300. For example, one or more operations of the method 300 may be implemented, at least in part, in the form of software instructions 168 of FIG. 1, stored on a tangible non-transitory machine-readable medium (e.g., memory 166 of FIG. 1) that when run by one or more processors (e.g., processor 162 of FIG. 1) may cause the one or more processors to perform operations 302-320.

At operation 302, the server 160 may access the digital content 104. For example, the server 160 may access the digital content 104 for evaluation periodically or on demand, similar to that described in FIGS. 1 and 2.

At operation 304, the server 160 may extract a first set of features 266 from the digital content 104. The features 266 may indicate physical and other types of features of the digital content 104, similar to that described in FIGS. 1 and 2.

At operation 306, the server 160 extracts a second set of features 230 from the compliance guideline 172 that indicates how to present the digital content 104, similar to that described in FIGS. 1 and 2. The second set of features 230 may include indications of the compliance guideline or rule to present the digital content 104.

At operation 308, the server 160 evaluates the first feature vector 224 representing the first set of features 226 against the second feature vector 228 representing the second set of features 230, similar to that described in FIGS. 1 and 2.

At operation 310, the server 160 determines whether the digital content 104 meets the compliance guideline 172 based on the evaluation in operation 308, similar to that described in FIGS. 1 and 2. If it is determined that the features 226 comply with or meet the respective rules indicated as features 226 (e.g., if the digital content 104 meets the compliance guideline 172), the method 300 proceeds to operation 318. Otherwise, the method 300 proceeds to operation 312.

At operation 312, the server 160 generates a feedback message 232 that reflects the determination of whether the digital content 104 meets the compliance guideline 172, similar to that described in FIGS. 1 and 2.

At operation 314, the server 160 determines one or more non-compliant features 226 of the digital content 104, similar to that described in FIGS. 1 and 2. The server 160 may also determine one or more compliant features 226 (if any) of the digital content 104.

At operation 316, the server 160 indicates the non-compliant features 226 in the feedback message 232, similar to that described in FIGS. 1 and 2.

At operation 318, the server 160 generates the feedback message 232 that reflects the determination of whether the digital content 104 meets the compliance guideline 172, similar to that described in FIGS. 1 and 2. The server 160 may determine one or more non-compliant features 226 (if any) of the digital content 104. The server 160 may also determine one or more compliant features 226 of the digital content 104.

At operation 320, the server 160 outputs the feedback message 232, similar to that described in FIGS. 1 and 2.

Operational Flow for Feature Extraction and Evaluation

Figure 4B:
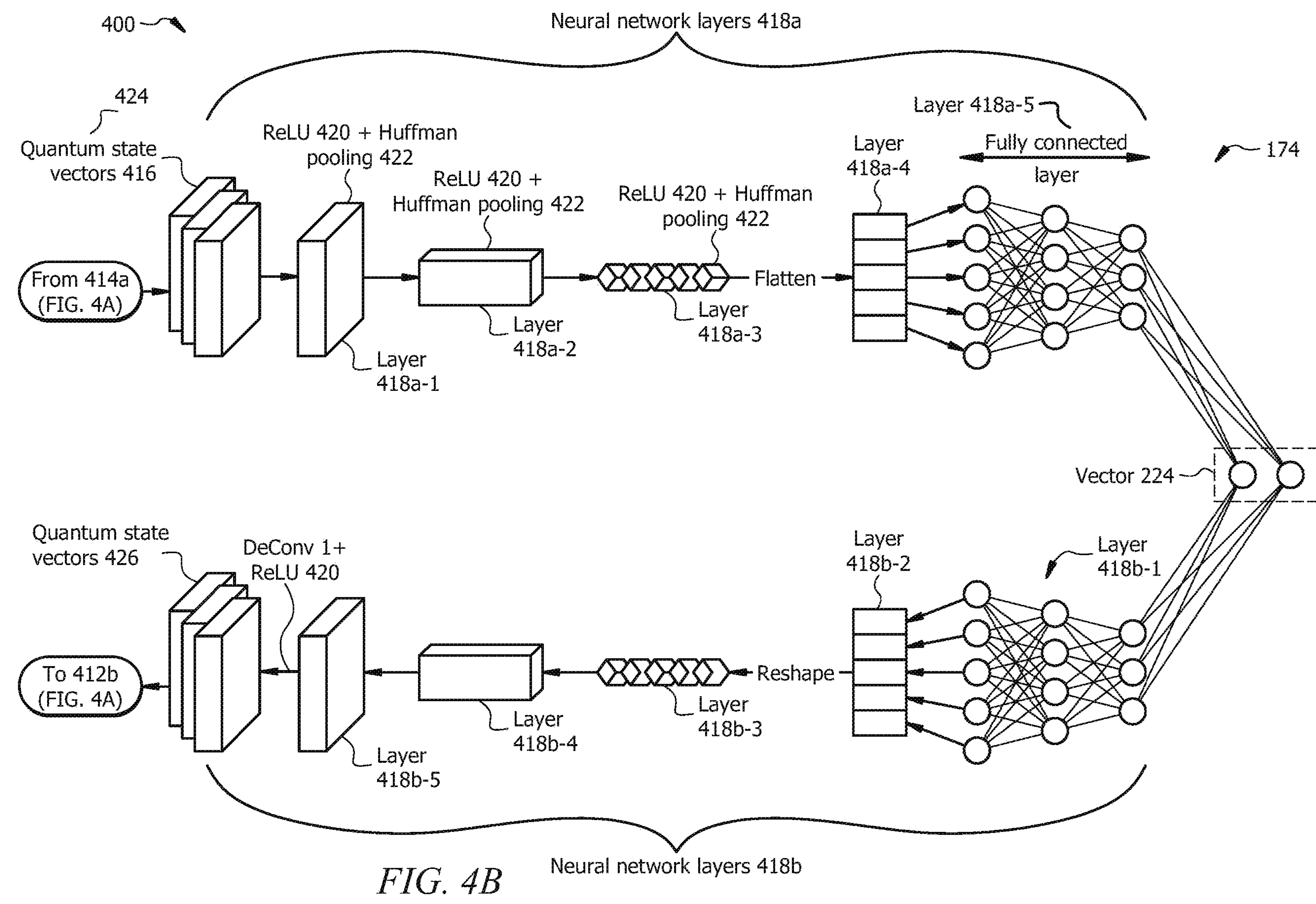

FIGS. 4A and 4B illustrate an example operational flow 400 of system 100 (see FIG. 1) for feature extraction and evaluation by the hybrid quantum and classical convolutional machine learning algorithm 174. In the illustrated embodiment, the hybrid quantum and classical convolutional machine learning algorithm 174 includes a quantum mapping algorithm 182, quantum convolutional filter layers 412*a* and 412*b*, and neural network layers 418*a* and 418*b*.

In operation, referring to FIG. 4A, the input vector 212 is fed to the hybrid quantum and classical convolutional machine learning algorithm 174. The quantum mapping algorithm 182 converts the input vector 212 into a first quantum state vector 410. The input vector 212 may include numerical values (classical values) which need to be represented in quantum form for quantum computing. In order to be processed by the quantum convolutional filter later 412*a*, the numerical values of the input vector 212 may need to be converted into quantum bits (qubits). Thus, the quantum mapping algorithm 182 is implemented to convert the input vector 212 into a first quantum state vector 410 as an input to the quantum convolutional filter layer 412*a*, where each classical numerical value is encoded as qubits that can be processed by the quantum convolutional filter layer 412*a*.

The quantum mapping algorithm 182 may initialize each value in the input vector 212 to respective qubit states within the quantum state vector 410. For example, the quantum mapping algorithm 182 may use an encoding scheme such as amplitude encoding, where numerical values from the input vector 212 are mapped into the probability amplitudes of quantum states. For example, the quantum mapping algorithm 182 may map each classical numerical value into a superposition of quantum states. In binary encoding, for example, a classical binary bit of 0 may be mapped to the quantum state |0⟩, and a binary bit of 1 may be mapped to the quantum state |1⟩.

For more complex encoding, such as amplitude encoding, multiple classical values may be encoded into the amplitudes of qubits in the quantum state vector 410. The quantum mapping algorithm 182 may initiate each value in the input vector 212 to the respective quantum bit(s) and populate the quantum state vector 410 with the initiated quantum bit(s). For example, the quantum mapping algorithm 182 may map each quantum bit within the quantum state vector 410 to the respective numerical value in the vector 212, and vice versa, e.g., by initiating a quantum bit |0> for each binary bit 0 in the vector 212 and a quantum bit |1> for each binary bit 1 in the vector 212, and vice versa. In another example, each number in vector 212 may be converted into a respective quantum bit sequence, e.g., by using amplitude encoding, where the amplitude of the quantum state represents the numerical value in vector 212. The first quantum state vector 410 may represent the features 226 (see FIG. 2) of the digital content 104 in the form of qubits. The conversion between quantum bits and classical numbers may be performed before and after each quantum convolutional filter layers 412*a* and 412*b*, e.g., by the quantum mapping algorithm 182.

Quantum Convolutional Filter Layer

The first quantum convolutional filter layer 412*a* may include a set of variational quantum gate circuits in the form of arrays. In the example of FIG. 4A, each quantum gate circuit may include Pauli-Y operators and Hadamard gates for rotating and entangling the qubits in the quantum state vector 410. The Pauli-Y operators (denoted by Ry in FIG. 4A) provide the rotation angles for the qubits. The Hadamard gates (denoted by H in FIG. 4A) allow the qubits to be moved into a state of superposition. Each quantum gate circuit may further include a Z-gate or Pauli-Z gate (denoted by Z) that is configured to flip the phase of a qubit |1⟩ state while leaving the |0⟩ state unchanged. The Z-gate may be used to manipulate the quantum states of the qubit and error correction technique. The horizontal lines may represent the flow of the qubits, and the vertical lines may represent the connection between the qubits. The illustrated quantum gate circuit configuration allows the qubits to rotate through different states, with their quantum states being determined by the current applied to them during the quantum operations.

Referring to FIG. 4B, after each rotation, the qubits may be measured during the measurement operation 414*a*. When measured, the qubits collapse to either |0⟩ or |1⟩, which produces a quantum output state (i.e., output tensor or second quantum state vector 416) that corresponds to the quantum-processed data. This operation allows the qubits' states to be transformed into classical data (in the form of natural or binary numbers) that can be processed further by the classical convolutional layers 418*a*. The output of the first quantum convolutional filter layer 412*a* is the output tensor, i.e., the second quantum state vector 416. The second quantum state vector 416 may include or be in the form of one or more quantum state vectors, one or more quantum state metrics, and/or the like.

The hybrid quantum and classical convolutional machine learning algorithm 174 generates the second quantum state vector 416 by performing quantum convolution operations on the first quantum state vector 410, as described above. For example, in some embodiments, the quantum convolution operation reduces a dimension of the first quantum state vector 410 such that each local section of quantum bits within the first quantum state vector 410 is represented by a single quantum bit in the second quantum state vector 416. In some embodiments, reducing the dimension of the first quantum state vector 410 may include identifying one or more first quantum bits that are associated with features that are less indicative of the digital content 104 (included in the input vector 212) compared to one or more second quantum bits within the first quantum state vector 410 and removing the identified first one or more features from the first quantum state vector 410.

Referring to FIG. 4A, the hybrid quantum and classical convolutional machine learning algorithm 174, via the quantum convolutional filter layer 412*a* may execute quantum convolution operations on the quantum state vector 410, where the quantum convolution operation, when executed by the processor of the server 160, causes the processor to extract a feature map that indicates a relationship between each local section of quantum state vector 410. The set of feature maps may be represented by the quantum bits in the quantum state vector 416. In a quantum convolution operation, one or more quantum gate circuits may be configured to operate as a kernel to perform a convolution operation on various local subsections of the input quantum state vector 410, (e.g., quantum gates may perform the quantum convolution operations). For example, the quantum gate circuits may perform matrix-wise convolution on qubits in each local subsection of the quantum state vector to detect patterns in each and among the local subsections of the quantum state vector 410. This process reduces the dimension of the quantum state vector 410 and provides the detected patterns in the output quantum state vector 416.

Classical Neural Network Layer

After the quantum convolutional filter layer 412*a* has processed the quantum state vector 410, the output, i.e., the second quantum state vector 416 is passed to the classical convolutional neural network layer 418*a* to further reduce the dimension of the vector 212 and to further identify additional patterns within the data. In some embodiments, the server 160 (e.g., via the quantum mapping algorithm 182 and/or hybrid quantum and classical convolutional machine learning algorithm 174) may initiate a second feature vector by mapping each quantum bit within the second quantum state vector 410 to the respective classical numerical value, e.g., to prepare the data to be processed by the classical neural network layer 418*a*. Each layer in the neural network layer 418*a-b* may include a set of neural networks. Each neural network may include a set of neurons arranged in an array. Each neuron may perform certain functions as specified by the server 160.

In the illustrated embodiment, the neural network layer 418*a* includes a set of neural network layers, such as convolutional layers, rectified liner unit (ReLu) layers 420, Huffman pooling layers 422, and the like. The ReLu layer 420 is configured to apply the ReLu activation function, which converts all negative values in the output tensor (quantum state vector 416) to zero and keeps the positive values unchanged. The Huffman pooling layer 422 is configured to implement Huffman encoding or compression operation on the data to reduce the dimension of the data and retain more important information from the data. The convolutional layer is configured to slide a filter matrix (as the kernel) across a given input vector (e.g., by performing a dot product between the filter matrix and each subsection of the given input vector) to determine the patterns within the given input vector.

In general, the neural network layer 418*a* implements transformations on the input vector and iteratively convolutes subsections of the quantum-derived data (i.e., quantum state vector 416) using element-wise matrix multiplication (e.g., via the filter matrices as kernels). This process extracts the patterns within the quantum state vector 416 and reduces the dimension of the data in each layer of the neural network layer 418*a*. This process produces progressively abstract feature(s) which are more indicative of each aspect of the input vector 212 compared to other features and flattens the data into a feature vector 224 stored in the latent space.

The neural network layer 418*a* may include layers 418*a*-1 to 418-5. In layer 418*a*-1, the output tensor of the quantum convolution is fed to a ReLu layer and Huffman pooling layer. In layer 418*a*-2, the output of the convolution operation performed on the data in layer 418*a*-1 is fed to a ReLu layer and Huffman pooling layer. In layer 418*a*-3, the output of the convolution operation performed on the data in layer 418*a*-2 is fed to a ReLu layer and Huffman pooling layer. Each of the layers 418*a*-1 to 418*a*-3 ma perform a combination of convolution, ReLu activation, and Huffman pooling to extract abstract features from the respective input. The convolution operation may reduce the dimension of the given feature vector at a given layer 418*a* such that each local section of numbers within the given feature vector is represented by a single number in the output feature vector. In layer 418*a*-4, the output of the layer 418*a*-3 is flattened to generate a vectorized feature map. In this process, the multi-dimensional tensor from the previous layer is converted into a one-dimensional vector. The output of the layer 418*a*-4 is fed to a fully connected layer 418*a*-5 to generate a final set of feature vectors for subsequent operations. The fully connected layer 418*a*-5 aggregates all the processed features from the previous layers and generates the feature vectors 224. In this manner, the server 160 (e.g., via the hybrid quantum and classical convolutional machine learning algorithm 174) may generate an output feature vector 224 by performing a set of convolution operations, ReLu activation operations, and Huffman pooling operations on the initial feature vector. Thus, the neural network layers 418*a* may perform convolution vector operations on the quantum feature vector 424 to reduce a dimension of the quantum feature vector 424 (represented by the quantum state vector 416), where the quantum feature vector 424 with reduced dimension represents extracted features that are more indicative of the input vector 212 (including the digital content 104) more than the rest of the initial features 226.

Evaluating the Feature Vector

Referring to FIG. 4B, the server 160 (e.g., via the hybrid quantum and classical convolutional machine learning algorithm 174) may evaluate the generated feature vector 224. In this process, in some embodiments, the server 160 (e.g., via the hybrid quantum and classical convolutional machine learning algorithm 174) may perform the reverse operations of the preceding layers (the first quantum convolutional filter layers 412*a* and the first neural network layers 418*a*) to generate the output vector 430 and compare the input vector 212 with the output vector 430 (see FIG. 4A). As mentioned above, the hybrid quantum and classical convolutional machine learning algorithm 174 may include a second neural network layer 418*b* and a second quantum convolutional filter layer 412*b*. The second neural network layer 418*b* may reverse the operation of the first neural network layers 418*a*. The second quantum convolutional filter layer 412*b* may reverse the operation of the quantum convolutional filter layers 412*a*.

The second neural network layer 418*b* may include the layers 418*b*-1 to 418*b*-5. The fully connected layer 418*b*-1 may include a set of arrays of neurons, where each neuron is connected to neurons in other layers. In layer 418*b*-1, the output vector 224 is reshaped to an initial structure to reverse the flattening operation performed in the preceding layers 418*a*-5. This operation converts the vectorized data back into its original multidimensional form. Each of the neural network layers 418*b*-2, 418*b*-3, 418*b*-4, and 418*b*-5 may include a combination of a convolutional network layer, a ReLu layer 420, and Huffman pooling layer 422. In layer 418*b*-2, upsampling is performed on the reshaped data. This leads to the dimension of the data being increased to match the original input size at the layer 418*a*-3. In each of the layers 418*b*-3 and 418*b*-4, the data progressively undergoes deconvolution (i.e., reverse convolution), in addition to the upsampling operation and ReLu activation. This process is to reverse the operations performed by the layers 418*a*-3 to 418*a*-2. In other words, the data is reconstructed in these layers to restore the original data. In layer 418*b*-5, the output of layer 418*b*-4 goes through a reverse convolution (as denoted by DeConv 1 in FIG. 4B), ReLu activation (via ReLu layer 420), and upsampling to reconstruct the data at the input of layer 418*a*-1. The output of the layer 418*b*-5 may be converted into a quantum state vector 426 by the quantum mapping algorithm 182, similar to that described above with respect to converting between classical numbers and quantum bits.

Referring to FIG. 4A, the quantum state vector 426 is fed to the second quantum convolutional filter layer 412*b* to perform quantum operations, such as rotations, entanglement, and measurement on the quantum state vector 426. This process is to reverse the quantum operations of the quantum convolutional filter layer 412*a*. The final output of the second quantum convolutional filter layer 412*b* may be measured during the measurement operation 414*b* (by the quantum convolutional filter layer 412*b*) to collapse the quantum bits into respective classical numbers (e.g., classical bits, natural numbers). The output of the measurement operation 414*b* may be a reconstructed version of the input data in the form of the output vector 430.

To determine whether the feature extraction process by the hybrid quantum and classical convolutional machine learning algorithm 174 is accurate, the server 160 (e.g., via the hybrid quantum and classical convolutional machine learning algorithm 174) may evaluate the output vector 430 against the input vector 212. To this end, the hybrid quantum and classical convolutional machine learning algorithm 174 may compare the input vector 212 (expected vector) with the output vector 430. For example, the hybrid quantum and classical convolutional machine learning algorithm 174 may determine a distance (e.g., Euclidean distance) between the input vector 212 and the output vector 430 in the vector space. If the determined distance is less than a threshold distance (e.g., less than 0.1, 0.2, etc.), it may be determined that the extracted features 226 indicated in the feature vector 224 sufficiently represent the original input vector 212. Otherwise, the hybrid quantum and classical convolutional machine learning algorithm 174 may update one or more of its parameters (e.g., bias and weight values of neural network layers 418*a* and 418*b*, parameters of the quantum convolutional layers 412*a* and 412*b*, etc.) and regenerate the feature vector 224. The feature extraction and evaluation processes may be performed iteratively until the distance between the input vector 212 and output vector 430 is less than the threshold distance.

In some embodiments, the server 160 (e.g., via the hybrid quantum and classical convolutional machine learning algorithm 174) may evaluate the output feature vector 224 by comparing it with the expected vector associated with the input vector 212, e.g., included in the training dataset 222, by determining the distance between them. If the distance between the vectors is less than the threshold, the server 160 may determine that the output feature vector 224 corresponds to the expected vector. In response, the server 160 may determine that the output feature vector 224 represents at least the digital content 104. The output of the hybrid quantum and classical convolutional machine learning algorithm 174 may include extracted feature vectors 224. A first feature vector 224 may indicate features 226 indicative of the digital content 104, a second feature vector 224 may indicate features 226 indicative of compliance guidelines 172, and a third feature vector 224 may indicate features 226 indicative of the evaluation result 208.

The hybrid quantum and classical convolutional machine learning algorithm 174 may provide several technical improvements. The quantum circuits of quantum convolutional filter layers 412*a* and 412*b* increase the accuracy of the features 226 compared to classical semi-conductor based circuits. The features 226 extracted using this approach retain the positional linkage and structure of facts/patterns within the input vector more accurately compared to classical neural networks. This process provides higher accuracy when these are used by the subsequent graph transformer network. The quantum convolutional layers operate on local subsections of the input data and hence the feature vector may be generated using fewer qubits with gates of shallow depth. The unconventional hybrid architecture provides the best of both approaches-quantum and classical convolutional layers. The storage of vectorized feature based output occupies less space, is more secure, and may be used to recreate the original input.

The feature vector 224 is provided to the learnable graph transformer machine learning algorithm 178 for further processing. This operation is described in conjunction with FIG. 6. In the training phase, various output feature vectors 244 or various portions of the output feature vector 244 may indicate one or more of digital content 104, compliance guideline 172, and evaluation results 208 of the historical evaluations, each labeled with extracted features (as indicated in expected feature vectors). The hybrid quantum and classical convolutional machine learning algorithm 174 learns the relationships between each data (digital content 104, compliance guideline 172, and evaluation results 208 of the historical evaluations) and its label and uses it for further feature extraction processes for unseen data. In the testing phase, various output feature vectors 244 or various portions of the output feature vector 244 may indicate one or more of digital content 104, compliance guideline 172, and evaluation results 208 of the historical evaluations, without labels. The hybrid quantum and classical convolutional machine learning algorithm 174 may apply the learned feature extraction process from the training phase to extract features from the new data.

Example Method for Feature Extraction and Evaluation

Figure 5:
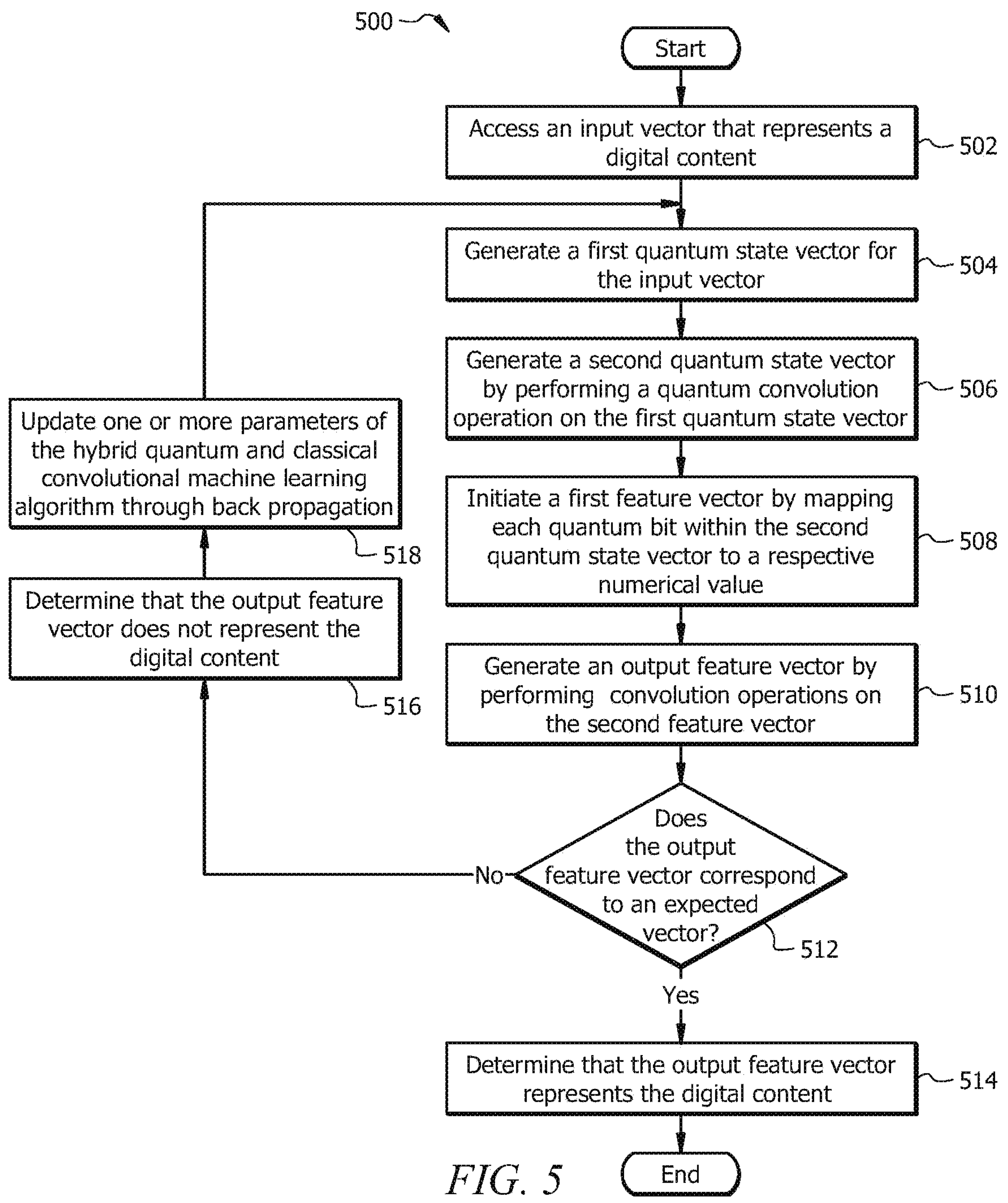
FIG. 5 illustrates an example flow chart of a method of the system of FIG. 1 for feature extraction and evaluation by a hybrid quantum and classical convolutional machine learning algorithm.

FIG. 5 illustrates an example flowchart of a method 500 for feature extraction and evaluation, according to some embodiments. Modifications, additions, or omissions may be made to method 500. The method 500 may include more, fewer, or other operations. For example, operations may be performed in parallel or in any suitable order. While at times it is discussed that the system 100, computing devices 120, server 160 (e.g., via hybrid quantum and classical convolutional machine learning algorithm 174), or components of any thereof perform some operations, any suitable system or components of the system may perform one or more operations of the method 500. For example, one or more operations of the method 500 may be implemented, at least in part, in the form of software instructions 168 of FIG. 1, stored on a tangible non-transitory machine-readable medium (e.g., memory 166 of FIG. 1) that when run by one or more processors (e.g., processor 162 of FIG. 1) may cause the one or more processors to perform operations 502-518.

At operation 502, the server 160 accesses an input vector 212 that represents digital content 104, similar to that described in FIGS. 4A and 4B.

At operation 504, the server 160 generates a first quantum state vector 410 for the input vector 212, similar to that described in FIGS. 4A and 4B.

At operation 506, the server 160 generates a second quantum state vector 416 by performing a quantum convolution operation on the first quantum state vector 410, e.g., via the quantum convolutional filter layer 412*a*, similar to that described in FIGS. 4A and 4B.

At operation 508, the server 160 initiates a first feature vector 424 by mapping each quantum bits within the second quantum state vector 416 to a respective numerical value, similar to that described in FIGS. 4A and 4B.

At operation 510, the server 160 generates an output feature vector 224 by performing convolution operations on the second feature vector 424, e.g., via the neural network layers 418*a*, similar to that described in FIGS. 4A and 4B.

At operation 512, the server 160 determines whether the output feature vector 224 corresponds to an expected vector, e.g., indicated in the training dataset 222, similar to that described in FIGS. 4A and 4B. For example, if more than a threshold number of features/numerical values (e.g., more than 90%, etc.) in the output feature vector 224 correspond to the counterpart features/numerical values in the expected vector, the server 160 may determine that the output feature vector 224 corresponds to an expected vector. Otherwise, the server 160 may determine that the output feature vector 224 does not correspond to the expected vector. If it is determined that the output feature vector 224 corresponds to the expected vector, the method 500 proceeds to operation 514. Otherwise, the method 500 proceeds to operation 516.

At operation 514, the server 160 determines that the output feature vector 224 represents the digital content 104 (and/or compliance guideline 172 and/or evaluation results 208).

At operation 516, the server 160 determines that the output feature vector 224 does not represent the digital content 104 (and/or compliance guideline 172 and/or evaluation results 208).

At operation 518, the server 160 updates one or more parameters of the hybrid quantum and classical convolutional machine learning algorithm 174, similar to that described in FIGS. 4A and 4B. In some embodiments, for verifying the output feature vector 224, the server 160 may perform reverse operations of the classical and convolutional neural network operations described above, e.g., via the neural network layers 418*b* and quantum convolutional filter layers 412*b* and generate the output vector 430. In response, the server 160 may compare the input vector 212 with the output vector 430 and determine that the output feature vector 224 represents the digital content 104 (and/or compliance guideline 172 and/or evaluation results 208) if the input vector 212 corresponds to the output vector 430, similar to that described in FIGS. 4A and 4B.

Figure 6:
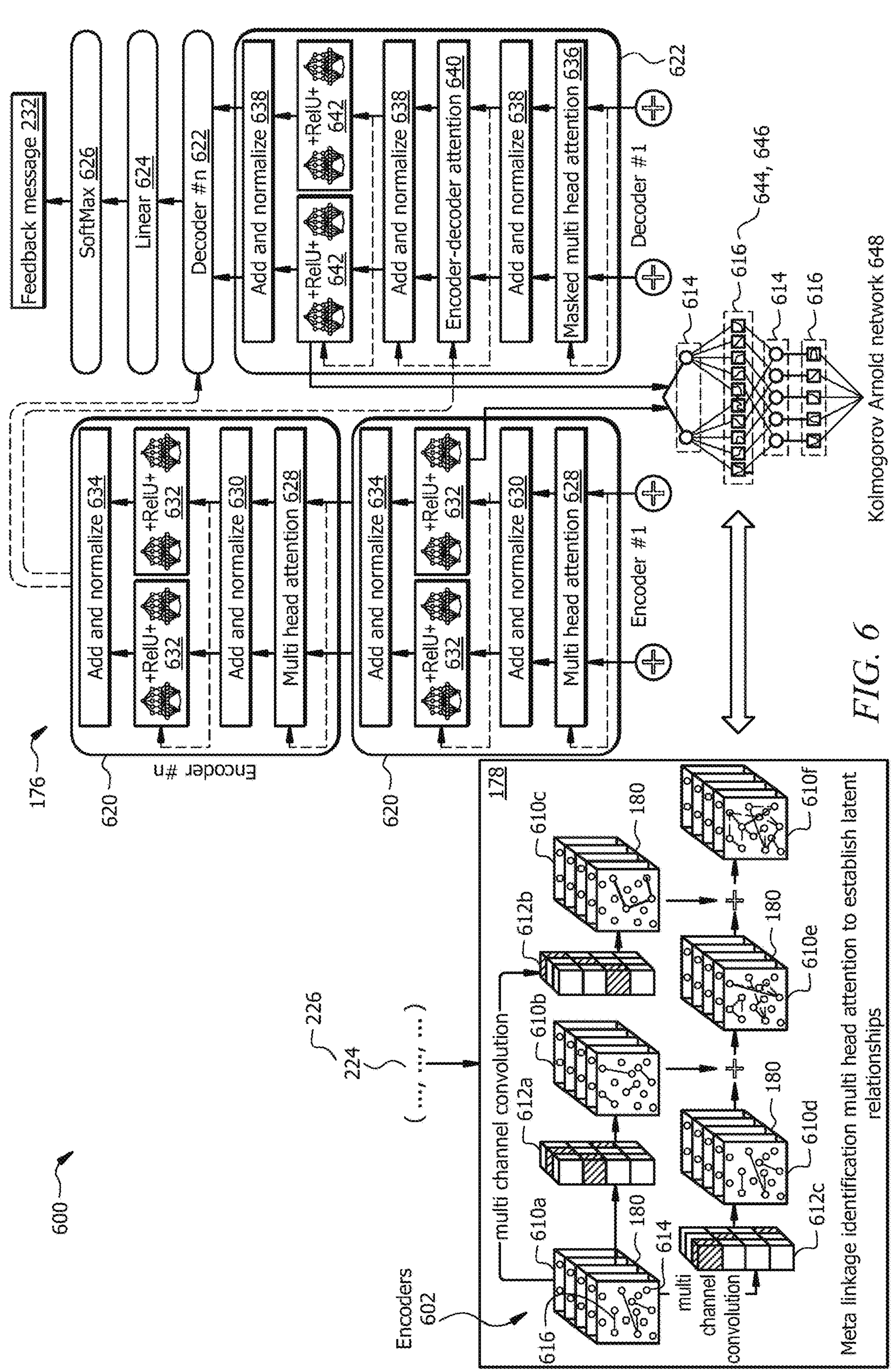
FIG. 6 illustrates an example operational flow of the system of FIG. 1 for evaluating digital content against a respective compliance rule.

Operational Flow for Evaluating the Digital Content Against the Respective Compliance Rule FIG. 6 illustrates an example operational flow 600 of system 100 (see FIG. 1) for evaluating the digital content 104 against the respective compliance document 170. The feature vectors 224 are provided to the learnable graph transformer machine learning algorithm 178. The learnable graph transformer machine learning algorithm 178 may include a set of multi-channel convolution layers 610*a* to 610*f* and a set of filters 612*a* to 612*c* (kernels). The content of the feature vectors 224 may be represented in layers in each of the layers 610*a* to 610*f*, where the knowledge graph 180 may include a set of nodes 614 and a set of edges 616. Each node 614 may represent a feature 226 or a compliance guideline 172 and an edge 616 may represent a relationship between each pair of nodes 614.

Generating a Knowledge Graph

The learnable graph transformer machine learning algorithm 178 may determine the relationships and association between nodes 614 through the layers 610*a* to 610*f* and filters 612*a* to 612*c*. each filter 612*a*—to 612*c* may be a kernel or weight matrix, where certain elements are set to one (denoted by dashed boxes) and others are set to zero (denoted by plain boxes). The algorithm 178, via each filter 612*a* to 612*c* may perform a dot product between the filter matrix and each subsection of the given input vector, e.g., to determine the patterns within the given input vector.

In layer 610*a*, the feature vectors 224 is represented in various layers or dimensions. Each layer or dimension may present a different portion of the feature vectors 224, e.g., a first dimension may represent at least a portion of features of the digital content 104, a second dimension may represent at least a portion of features of the compliance guidelines 172, a third dimension may represent at least a portion of features of the evaluation results 208 of historical evaluations of historical digital content 104 against respective compliance guidelines 172. In some embodiments, each dimension may include features associated with one or more of digital content 104, compliance guidelines 172, and evaluation results 208.

In each layer 610 via each filter 612, a spatial convolution operation may be performed on the given input. In layer 610*a*, e.g., via filter 612*a*, a spatial convolution operation is performed on the feature vectors 224 to determine the relationship and association between nodes 614 (indicated by edges 616). The filter 612*a* is executed on the data at the layer 610*a* to identify a first set of complex relationships between the nodes 614 and edges 616. The filter 612*a* operates using a matrix, often referred to as a kernel or weight matrix, where certain elements are set to one (denoted by dashed boxes) and others are set to zero (denoted by plain boxes). This matrix determines which features or relationships in the input (from layer 610*a*) are to be focused on. The features 226 corresponding to the positions marked with one in the matrix are evaluated in the next operation, while the features 226 corresponding to matrix values marked with zero are ignored. This way, the model may selectively attend to the most relevant relationships in the knowledge graph 180. This way, neighborhood information across different layers/dimensions may be captured which allows the learnable graph transformer machine learning algorithm 178 to learn multi-hop relationships between the nodes 614 and edges 616.

The filter 612*b* may be executed on the data at the layer 610*a* to identify additional complex relationships between the nodes 614 and edges 616 in the knowledge graph 180. The filter 612*b* may use a different matrix (compared to filters 612*a* and 612*c*) to focus on other dimensions/layer combinations within the knowledge graph 180. The output of the filter 612*b* may be the updated knowledge graph 180 with additional identified edges 616 between certain nodes 614-shown as a part of the layer 610*b*. Similarly, the filter 612*c* may be executed on the data at the layer 610*a* to identify additional complex relationships between the nodes 614 and edges 616 in the knowledge graph 180. The filter 612*b* may use a different matrix (compared to filters 612*a* and 612*c*) to focus on other dimensions/layer combinations within the knowledge graph 180. The output of the filter 612*c* may be the updated knowledge graph 180 with newly identified edges 616 between certain nodes 614-shown as a part of layer 610*d*.

The knowledge graphs 180 at layers 610*b* and 610*d* are aggregated (combined or added) to generate the updated knowledge graph 180 at layer 610*e*. The knowledge graphs 180 at layers 610*c* and 610*e* are aggregated (combined or added) to generate a further updated knowledge graph 180 at layer 610*f*. In this way, the learnable graph transformer machine learning algorithm 178 may implement multi-layer filters and aggregations to uncover deeper, multi-dimensional relationships between the nodes 614 and edges 616.

The learnable graph transformer machine learning algorithm 178 may be implemented by a graph transformer network that is configured to ingest feature vectors 224, learn complex spatiotemporal patterns and feature embeddings using a combination of spatial convolution and multi-head attention modules, and generate the knowledge graph 180. The learnable graph transformer machine learning algorithm 178 may aggregate multi-hop neighborhood information to identify relationships between entities (e.g., nodes 614). To this end, the learnable graph transformer machine learning algorithm 178 may create nodes 614, edges 616, and graph embeddings to derive associations across different nodes 614.

The learnable graph transformer machine learning algorithm 178 may include encoders 602. Each encoder 602 may include layers 610 that include multi-head attention modules and feed-forward neural networks. The layers 610 (e.g., layers 610*a* to 610*f*) may determine dependencies between different parts of the input (e.g., between nodes 614). The multi-head attention module may be implemented by the processor of the server 160 executing software instructions 168, and configured to weigh the importance of different portions of the input data. After being processed by each encoder 602, each node 614 may be associated with or receive a contextual representation that represents its relationship with one or more other nodes 614 via edges 616.

The learnable graph transformer machine learning algorithm 178 may predict relationships among the nodes 614 based on the learned relationships during the training process on the historical data, i.e., training dataset 222 (see FIG. 2). In this process, the learnable graph transformer machine learning algorithm 178 classifies whether the nodes 614 are related to each other and determines the type of relationships between them, such as cause-effect, co-occurrence, etc. The output layer may be a fully connected layer followed by a soft-max activation for the classification process and/or regression process for the continuous prediction process. The learnable graph transformer machine learning algorithm 178 may transform the contextual representations of the nodes 614 into predictions of relationships between new, unseen nodes 614.

The learnable graph transformer machine learning algorithm 178 may be trained using the training dataset 222 (see FIG. 2) in which known relationships between nodes 614 are used to adjust the parameters (e.g., weight and bias values of neural networks of the encoders 602) of the algorithm 178 to reduce the prediction errors over time through feedback and backpropagation. The learnable graph transformer machine learning algorithm 178 may be evaluated on a test dataset that includes unlabeled digital content 104 and compliance guidelines 172 to determine the prediction accuracy of the algorithm 178. When the prediction accuracy of the algorithm 178 reaches at least a threshold percentage (e.g., more than 90%, 95%), the algorithm 178 may be deployed to process new digital content 104 and determine whether it meets a respective compliance guidelines 172. The algorithm 178 may be implemented by unsupervised learning to extract knowledge from labeled training datasets. The algorithm 178 may create nodes 614, edges 616, and graph embeddings to evaluate new digital content 104 in terms of compliance guidelines 172 and predict and detect non-compliance aspects of the digital content 104. In this manner, the server 160, e.g., via the learnable graph transformer machine learning algorithm 178 may generate the knowledge graph 180. For example, assume that a first node 614 may represent a first physical feature 226 of the digital content 104, a second node 614 may represent a first compliance guideline 172 on how to present the first physical feature 226 of the digital content 104, and the first and second nodes 614 are linked together by an edge 616, where the edge 616 may represent a relationship resulting in the evaluation result 208 that indicates whether the first physical feature 226 meets the first compliance guideline 172.

Evaluating the Digital Content Against the Compliance Guidance

The generated knowledge graph 180 is provided to the federated multi-modal machine learning algorithm 176. The federated multi-modal machine learning algorithm 176 may include the encoders 620 (e.g., encoders 1 through n), decoders 622 (e.g., decoders 1 through n), linear neural network layers 624, and soft-max activation layers 626. In the illustrated embodiment, two encoders 620 are shown, however, the federated multi-modal machine learning algorithm 176 may include any number of encoders 620. For example, one or more encoders 620 may be between the two illustrated encoders 620. Similarly, the federated multi-modal machine learning algorithm 176 may include any number of decoders 622. For example, one or more decoders 622 may be between the two illustrated decoders 622. In some embodiments, the federated multi-modal machine learning algorithm 176 may include a parallel stack of layers, each layer comprising encoders 620 and corresponding decoders 622, linear layers 624, and SoftMax layers 626, where each layer may be dedicated to evaluate and process a different type of digital content 104. For example, one layer may be configured to process and evaluate text content 104, another layer may evaluate image-based content 104, another layer may evaluate audio content 104, and another layer may evaluate video content 104. Each of these layers is dedicated to extract and evaluate the respective features of the content type against the relevant compliance guidelines 172. One of the layers of the federated multi-modal machine learning algorithm 176 is shown in the example of FIG. 6. In light of the present disclosures, it is understood that the federated multi-modal machine learning algorithm 176 may include multiple such layers in parallel to evaluate different types of digital content 104. The encoders 620 may transform the input data, e.g., knowledge graph 180 (feature vectors, compliance guidelines, and their relationships indicated in vectors or matrices) into an abstract, high-dimensional representation. This process encodes the nodes and edges of the knowledge graph 180 into a more structured format to determine and capture dependencies between them and filter out irrelevant or redundant information.

The decoders 622 understand the attention relations derived by encoders 620 to translate the abstract representation of the data back to a more interpretable, contextual format. This process is to decode the output of the encoders 620 to be represented as actionable data that can be processed for the compliance evaluation. The linear neural network layers 624 may apply a linear transformation on the output of the decoders 622 to combine and refine the data from previous layers and to prepare the data for final compliance evaluation.

The soft-max activation layer 626 may convert the output of the previous layers into probabilities to determine the likelihood of each feature 226 complying with the respective compliance guideline 172 to provide the final evaluation of whether the digital content 104 meets the compliance guidelines 172 in terms of each feature 226.

The output of the first encoder 620 may be fed to a subsequent encoder 620. The output of the last encoder 620 may be fed to the decoders 622. The output of the first decoder 622 may be fed to a subsequent decoder 622. The output of the last decoder 622 may be fed to a linear neural network layer 624. The output of the linear activation layer 624 may be fed to the soft-max activation layer 626. Each encoder 620 may include a multi-head attention layer 628, a first add and normalize layer 630, an array of ReLu activation layers 632, and a second add and normalize layer 634. Each encoder 620 performs a set of transformations on the input data (e.g., knowledge graph 180) to capture relationships between the elements of the input data. The output of the first encoder 620 is passed to a subsequent encoder 620, and this process is repeated until the last encoder 620, whose output is then passed to the decoders 622.

Encoding the Input Data into a More Contextual Representation

The multi-head attention layer 628 enables the encoder 620 to focus on multiple parts of the input simultaneously to capture long-range dependencies between the elements of the knowledge graph 180 (e.g., features 226). The first add and normalize layer 630 sums and normalizes the output of the multi-head attention layer 628 to maintain the residual dependencies between the elements of the knowledge graph 180.

The array of neural network layer 632 may include neural network layers 648 that may be implemented by software instructions configured to perform learnable activation functions on edges 616 and sum operations on nodes 614. In the illustrated embodiment, the neural network layers 648 may include Kolmogorov-Arnold Networks instead of conventional fully connected layers. This structure improves the learnability and adaptability of the encoder 620 (and decoder 622) by allowing more dynamic updates in the node-edge relationships via the learnable activation functions. The sum operations on the nodes 614 may aggregate the compliance evaluation results 208 across different features 226 against each of their respective compliance guidelines 172.

The array of neural network layer 632 may further include a ReLu activation layer between arrays of neural network layers 648 to introduce non-linear transformations after the operation of each neural network layer 648. In the encoder 620, the output of the neural network layer 632 is a contextualized feature vector and is fed to the second add and normalize layer 632 to maintain the residual dependencies between the elements of the data.

Decoding the Contextualized Feature Vectors into Intelligible Language

Each decoder 622 may include a masked multi-head attention layer 636, a first add and normalize layer 638, an encoder-decoder attention layer 640, a second add and normalize layer 638, an array of neural network layers 642, and a third add and normalize layer 638. The masked multi-head attention layer 636 may be configured to process and focus on different parts of the input to determine short-range dependencies between different parts of the input, in parallel. Therefore, different types of relationships between different parts of the input may be determined. For example, a first attention head may focus on short-range dependencies between nearby features 226 (e.g., nearby words in text, nearby pixels in an image, etc.), and a second attention head may focus on long-range dependencies between distant features 226 (e.g., distant words in text, distant pixels in an image, etc.).

The output of the masked multi-head attention layer 636 is fed to the first add and normalize layer 638 to sum and normalize the determined associations and relationships between different parts of the given input. The output of the first add and normalize layer 638 is fed to the encoder-decoder attention layer 640. The encoder-decoder attention layer 640 may receive the output from the encoder 620. The encoder-decoder attention layer 640 may be configured to align or associate the output from the encoder 620 to the data at the decoder 622. In other words, the encoder-decoder attention layer 640 may map different parts of the output of the encoder 620 to the respective parts of the data being processed at the decoder 622. The decoder 622 may use this information to identify which parts of the features 226 from the output of the encoder 620 are more relevant for determining whether a given feature 226 meets a respective compliance guideline 172.

The output of the encoder-decoder attention layer 640 may be fed to the second add and normalize layer 638 to sum and normalize the determined associations and relationships between different parts of the given input. The output of the second add and normalize layer 638 may be fed to the array of neural network layers 642. The array of neural network layers 642 may be the same or substantially similar to the array of neural network layer 632. In a particular example, assume that a first node 614 represents a feature 226 of digital content 104, such as the color contrast ratio of an image on a webpage, a second node 614 represents a respective compliance guideline 172, such as a rule that specifies the minimum contrast ratio required for an image to be accessible and comprehendible by users with visual impairments. The edge 616 between these two nodes 614 represents the relationship between the feature 226 and the compliance guideline 172, specifically whether the color contrast ratio meets the required minimum contrast ratio compliance guideline 172.

The neural network layers 642 adjust the weight 644 of the edge 616, which reflects the degree of compliance or non-compliance of the feature 226 meeting the respective compliance guideline 172, e.g., based on evaluation results 208 between the feature 226 and the compliance guideline 172. For example, if it is determined that the feature 226 of the digital content 104 does not meet the respective compliance guideline 172, the server 160 (e.g., via the neural network layers 642) may reduce the weight 644 of the edge 616 between the nodes 614 representing the feature 226 and respective compliance guideline 172. Otherwise, the server 160 (e.g., via the neural network layers 642) may increase the weight 644 of the edge 616. In the example above, if the color contrast ratio feature 226 does not meet the respective compliance guideline 172, the algorithm 176 may reduce the weight 644 of the edge 616. Otherwise, the algorithm 176 may increase the weight 644 of the edge 616.

The adjusted value of the weight 644 may reflect a confidence score of the physical feature 266 meeting the respective compliance guideline 172. The output of the neural network layers 642 may be a transformed feature vector and is fed to the third add and normalize layer 638 to sum and normalize the determined associations and relationships between different parts of the given input. The transformed feature vector may include adjusted weights 644 of the edges 616 (relationships) for each two or more nodes 614 (features 226 and compliance guidelines 172). Through multiple decoders 622, the relationships between nodes 614 may be refined by iteratively adjusting the weights 644 based on feedback and the outcome of the previous decoder(s) 622. The linear activation function layer 624 may implement a linear transformation to the final output of the decoders 622 to combine the results of the previous layers. The soft-max activation function layer 626 may determine the probability of each feature 226 meeting the respective guideline 172 based on the results of the previous layers. The algorithm 176 (e.g., via the soft-max activation function layer 626) may decide or determine whether each digital content 104 meets the respective compliance guideline 172 based on the respective adjusted weight 644.

The overall compliance evaluation and determination of the digital content 104 may be based on a combined or aggregated compliance evaluation and determination of each individual feature 266 of the digital content 104 against the respective compliance guideline 172. Continuing the example above with respect to the first feature 266 and associated compliance guideline 172 represented by first and second nodes 614, and their relationship represented by the first edge 616, assume that a third node 614 may represent the font size of the webpage text (another physical feature 226), and a fourth node 614 may represent a compliance guideline 172 requiring a minimum font size, and a second edge 616 between the third and fourth nodes 614 indicates the relationship resulting in evaluation result for whether the second feature 266 (in this example, text font size) meets the respective compliance guideline 172. The second weight 644 associated with the second edge 616 may represent the second confidence score 646 of the second feature 266 meeting its compliance guideline 172.

The algorithm 176 may iteratively adjust the weights 644 for features 266 (e.g., in this example the image contrast and text font size) by analyzing feedback and outcomes from prior layers. The algorithm 176 may aggregate the adjusted weights 644 and/or the confidence scores 646 for features 266 (e.g., in this example the image contrast and text font size) to generate a combined compliance score (also referred to herein as a combined confidence score 646 or overall compliance evaluation) for the digital content 104 in terms of the evaluated features 266 against the respective compliance guidelines 172.

The combined compliance score may combine or add the compliance scores (e.g., the confidence scores 646). For example, if the combined compliance score is more than a threshold value (e.g., more than 90%, 95%, etc.), the algorithm 176 may determine that the digital content 104 meets the respective compliance guideline 172 with respect to the evaluated features 266. Otherwise, the algorithm 176 may determine that the digital content 104 does not meet the respective compliance guideline 172 with respect to the evaluated features 266.

The evaluation process may be granular at the feature level and feature-specific. For example, if the digital content 104 includes multiple features 266, the algorithm 176 may evaluate each of these features 266 independently against their respective compliance guidelines 172. The algorithm 176 may also evaluate the digital content 104 as a whole based on the overall, combined compliance score. The algorithm 176 may generate the feedback message 232, which reflects the determination of whether each digital content 104 satisfies the respective compliance guideline 172. The feedback message 232 may include an evaluation result of each feature 266 against the respective compliance guidelines 172, and an overall evaluation result for the digital content 104 based on the combined compliance score.

Figure 7:
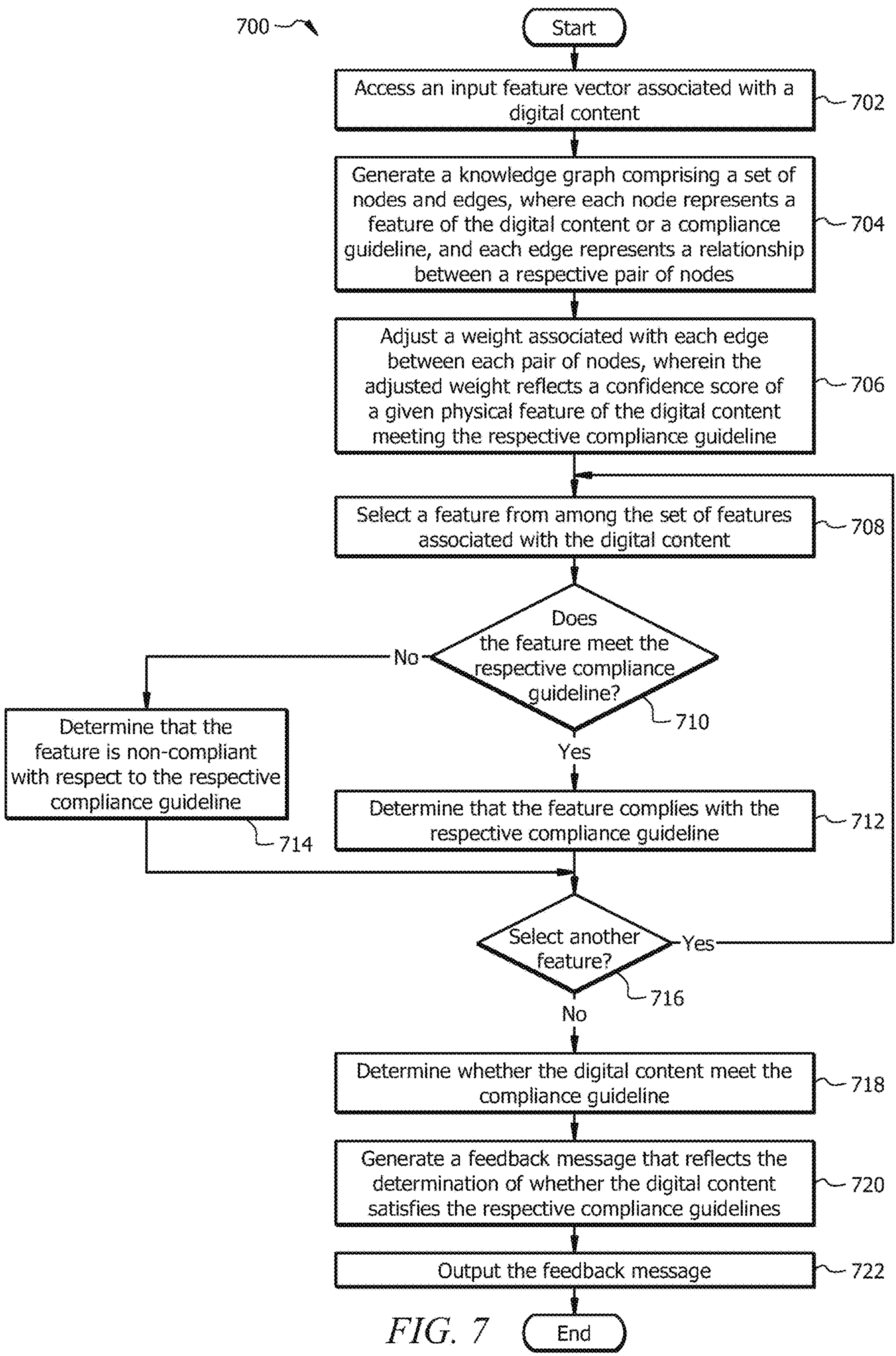
FIG. 7 illustrates an example flow chart of a method of the system of FIG. 1 for evaluating digital content against a respective compliance rule.

Example Method for Evaluating the Digital Content Against the Respective Compliance Rule FIG. 7 illustrates an example flowchart of a method 700 for evaluating the digital content 104 against the respective compliance rule, according to some embodiments. Modifications, additions, or omissions may be made to the method 700. The method 700 may include more, fewer, or other operations. For example, operations may be performed in parallel or in any suitable order. While at times it is discussed that the system 100, computing devices 120, server 160 (e.g., via federated multi-modal machine learning algorithm 176 and learnable graph transformer machine learning algorithm 178), or components of any thereof perform some operations, any suitable system or components of the system may perform one or more operations of the method 700. For example, one or more operations of method 700 may be implemented, at least in part, in the form of software instructions 168 of FIG. 1, stored on a tangible non-transitory machine-readable medium (e.g., memory 166 of FIG. 1) that when run by one or more processors (e.g., processor 162 of FIG. 1) may cause the one or more processors to perform operations 702-722.

At operation 702, the server 160 accesses an input feature vector 224 associated with digital content 104, similar to that described in FIGS. 2 and 6.

At operation 704, the server 160 generates a knowledge graph 180 comprising a set of nodes 614 and edges 616, where each node 614 represents a given physical feature 226 of the digital content 104 or a compliance guideline 172, and each edge 616 represents a relationship between a respective pair of nodes 614, similar to that described in FIGS. 2 and 6.

At operation 706, the server 160 adjusts a weight 644 associated with each edge 616 between each pair of nodes 614, where the adjusted weight reflects a confidence score 646 of a given physical feature 266 of the digital content 104 meeting the respective compliance guideline 172, similar to that described in FIGS. 2 and 6.

At operation 708, the server 160 selects a feature 226 from among the set of features 226. The server 160 may iteratively select a feature 226 until no feature 226 is left for evaluation.

At operation 710, the server 160 determines whether the feature 226 meets the respective compliance guideline 172, similar to that described in FIGS. 2 and 6. If it is determined that the feature 226 meets the respective compliance guideline 172, the method 700 proceeds to operation 712. Otherwise, the method 700 proceeds to operation 714.

At operation 712, the server 160 determines that the feature 226 complies with the respective compliance guideline 172, similar to that described in FIGS. 2 and 6.

At operation 714, the server 160 determines that the feature 226 is non-compliant with respect to the respective compliance guideline 172, similar to that described in FIGS. 2 and 6.

At operation 716, the server 160 determines whether to select another feature 226. The server 160 determines to select another feature 226 if at least one feature 226 is left for evaluation. If it is determined that at least one feature 226 is left for evaluation, the method 700 returns to operation 708. Otherwise, the method 700 proceeds to operation 718.

At operation 718, the server 160 determines whether the digital content 104 meets the respective compliance guideline 172 based on the aggregate of individual compliance evaluation of each feature 226, similar to that described in FIGS. 2 and 6.

At operation 720, the server 160 generates a feedback message 232 that reflects the determination of whether the digital content 104 satisfies the respective compliance guidelines 172, similar to that described in FIGS. 2 and 6.

At operation 722, the server 160 outputs the feedback message 232, similar to that described in FIGS. 2 and 6.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112 (f), as it exists on the date of filing hereof, unless the words "means for" or "step for" are explicitly used in the particular claim.

The invention claimed is:

1. A system comprising:

a memory configured to store a compliance document associated with a first digital content, wherein the compliance document comprises text that indicates a first compliance guideline to present the first digital content; and a processor, operably coupled to the memory, and configured to:

train a hybrid quantum and classical convolutional machine learning algorithm on a training dataset, wherein:

the training dataset comprises a set of historical digital content, wherein a given historical digital content of the set of historical digital content is labeled with a respective compliance guideline, an evaluation result indicating whether the given historical digital content meets the respective compliance guideline, and a respective feature vector of numerical values indicating respective physical attributes of the given historical digital content; and training the hybrid quantum and classical convolutional machine learning algorithm on the training dataset, comprises:

determine a mapping between each physical feature of the given historical digital content to a portion of the respective compliance guideline;

determine an indication of whether a given physical feature of the given historical digital content meets the portion of the respective compliance guideline;

adjust, based at least in part upon the determined mapping and the determined indication, at least one of a first plurality of parameters of a neural network of the hybrid quantum and classical convolutional machine learning algorithm; and adjust, based at least in part upon the determined mapping and the determined indication, at least one of a second plurality of parameters of quantum circuits of the hybrid quantum and classical convolutional machine learning algorithm;

access the first digital content comprising at least one of text, an image, an audio, or a video;

extract, by the trained hybrid quantum and classical convolutional machine learning algorithm, a first set of features from the first digital content, wherein:

the first set of features comprises at least a physical attribute associated with the first digital content;

extract, by the trained hybrid quantum and classical convolutional machine learning algorithm, a second set of features from the compliance document, wherein:

the second set of features comprises an indication of the first compliance guideline to present the first digital content;

evaluate, by the trained hybrid quantum and classical convolutional machine learning algorithm, the first set of features against the second set of features;

determine, based at least in part upon the evaluation of the first set of features against the second set of features, whether the first digital content meets the first compliance guideline;

generate a feedback message that reflects the determination of whether the first digital content meets the first compliance guideline; and output the generated feedback message.

2. The system of claim 1, wherein:

the feedback message reflects the determination that the first digital content does not meet at least a portion of the first compliance guideline; and the feedback message comprises an updated version of the first digital content that complies with the first compliance guideline.

3. The system of claim 2, wherein the feedback message further comprises a suggestive instruction that indicates to implement the updated version of the first digital content.

4. The system of claim 1, wherein:

the first set of features is represented by a first feature vector comprising a first set of numerical values;

the second set of features is represented by a second feature vector comprising a second set of numerical values; and evaluating the first set of features against the second set of features comprises:

generating, based at least in part upon the first feature vector and the second feature vector, a knowledge graph that comprises the first digital content linked with the first compliance guideline by a line that represents a relationship between the first digital content and the first compliance guideline denoting a validation result of the first digital content satisfying the first compliance guideline; and determining whether the first digital content meets the first compliance guideline based at least in part upon the validation result.

5. The system of claim 1, wherein the processor is further configured to evaluate that the first set of features represents the first digital content, by:

generating an input feature vector that represents the first set of features as numerical values;

generating a quantum state vector that represents the input feature vector as a first set of quantum bits;

executing, via a plurality of quantum gates, a quantum convolution operation on the quantum state vector, wherein the quantum convolution operation, when executed by the processor, causes the processor to extract a feature map that indicates a relationship between each local section of quantum state vector;

generating a quantum feature vector in which a set of feature maps is represented by a second set of quantum bits;

performing, via a convolutional neural network layer, a convolution vector operation on the quantum feature vector to reduce a dimension of the quantum feature vector, wherein the quantum feature vector with reduced dimension represents at least one feature, from among the first set of features, that is indicative of the first digital content more than a rest of the first set of features;

generating an output feature vector by performing a reverse operation of each of a preceding operation;

comparing the output feature vector with the input feature vector;

determining a distance between the output feature vector and the input feature vector in a vector space; and determining that the determined distance is less than a threshold distance.

6. The system of claim 5, wherein generating a quantum feature vector in which the set of feature maps is represented by the second set of quantum bits comprises initiating a quantum bit |0> for each binary bit 0 in the input feature vector and a quantum bit |1> for each binary bit 1 in the input feature vector.

7. The system of claim 1, wherein the processor is further configured to pre-process the first digital content, comprising at least one of resizing the first digital content to a unified size, color space conversion to a unified color scheme, or data augmentation to generate a set of augmented versions of the first digital content.

8. A method comprising:

training a hybrid quantum and classical convolutional machine learning algorithm on a training dataset, wherein:

the training dataset comprises a set of historical digital content, wherein a given historical digital content of the set of historical digital content is labeled with a respective compliance guideline, an evaluation result indicating whether the given historical digital content meets the respective compliance guideline, and a respective feature vector of numerical values indicating respective physical attributes of the given historical digital content; and training the hybrid quantum and classical convolutional machine learning algorithm on the training dataset, comprises:

determining a mapping between each physical feature of the given historical digital content to a portion of the respective compliance guideline;

determining an indication of whether a given physical feature of the given historical digital content meets the portion of the respective compliance guideline;

adjusting, based at least in part upon the determined mapping and the determined indication, at least one of a first plurality of parameters of a neural network of the hybrid quantum and classical convolutional machine learning algorithm; and adjusting, based at least in part upon the determined mapping and the determined indication, a at least one of a second plurality of parameters of quantum circuits of the hybrid quantum and classical convolutional machine learning algorithm;

accessing a first digital content comprising at least one of text, an image, an audio, or a video;

extracting, by the trained hybrid quantum and classical convolutional machine learning algorithm, a first set of features from the first digital content, wherein:

the first set of features comprises at least a physical attribute associated with the first digital content;

extracting, by the trained hybrid quantum and classical convolutional machine learning algorithm, a second set of features from a compliance document, wherein:

the compliance document comprises text that indicates a first compliance guideline to present the first digital content; and the second set of features comprises an indication of the first compliance guideline to present the first digital content;

evaluating, by the trained hybrid quantum and classical convolutional machine learning algorithm, the first set of features against the second set of features;

determining, based at least in part upon the evaluation of the first set of features against the second set of features, whether the first digital content meets the first compliance guideline;

generating a feedback message that reflects the determination of whether the first digital content meets the first compliance guideline; and outputting the generated feedback message.

9. The method of claim 8, wherein:

the feedback message reflects the determination that the first digital content does not meet at least a portion of the first compliance guideline; and the feedback message comprises an updated version of the first digital content that complies with the first compliance guideline.

10. The method of claim 9, wherein the feedback message further comprises a suggestive instruction that indicates to implement the updated version of the first digital content.

11. The method of claim 8, wherein:

the first set of features is represented by a first feature vector comprising a first set of numerical values;

the second set of features is represented by a second feature vector comprising a second set of numerical values; and evaluating the first set of features against the second set of features comprises:

generating, based at least in part upon the first feature vector and the second feature vector, a knowledge graph that comprises the first digital content linked with the first compliance guideline by a line that represents a relationship between the first digital content and the first compliance guideline denoting a validation result of the first digital content satisfying the first compliance guideline; and determining whether the first digital content meets the first compliance guideline based at least in part upon the validation result.

12. A non-transitory computer-readable medium storing instructions that, when executed by a processor, cause the processor to:

train a hybrid quantum and classical convolutional machine learning algorithm on a training dataset, wherein:

the training dataset comprises a set of historical digital content, wherein a given historical digital content of the set of historical digital content is labeled with a respective compliance guideline, an evaluation result indicating whether the given historical digital content meets the respective compliance guideline, and a respective feature vector of numerical values indicating respective physical attributes of the given historical digital content; and training the hybrid quantum and classical convolutional machine learning algorithm on the training dataset, comprises:

determine a mapping between each physical feature of the given historical digital content to a portion of the respective compliance guideline;

determine an indication of whether a given physical feature of the given historical digital content meets the portion of the respective compliance guideline;

adjust, based at least in part upon the determined mapping and the determined indication, at least one of a first plurality of parameters of a neural network of the hybrid quantum and classical convolutional machine learning algorithm; and adjust, based at least in part upon the determined mapping and the determined indication, a at least one of a second plurality of parameters of quantum circuits of the hybrid quantum and classical convolutional machine learning algorithm;

access a first digital content comprising at least one of text, an image, an audio, or a video;

extract a first set of features from the first digital content, wherein:

the first set of features comprises at least a physical attribute associated with the first digital content;

extract a second set of features from a compliance document, wherein:

the compliance document comprises text that indicates a first compliance guideline to present the first digital content; and the second set of features comprises an indication of the first compliance guideline to present the first digital content;

evaluate the first set of features against the second set of features;

determine, based at least in part upon the evaluation of the first set of features against the second set of features, whether the first digital content meets the first compliance guideline;

generate a feedback message that reflects the determination of whether the first digital content meets the first compliance guideline; and output the generated feedback message.

13. The method of claim 12, wherein generating a quantum feature vector in which the set of feature maps is represented by the second set of quantum bits comprises initiating a quantum bit |0> for each binary bit 0 in the input feature vector and a quantum bit |1> for each binary bit 1 in the input feature vector.

14. The method of claim 8, further comprising preprocessing the first digital content, comprising at least one of resizing the first digital content to a unified size, color space conversion to a unified color scheme, or data augmentation to generate a set of augmented versions of the first digital content.

15. A non-transitory computer-readable medium storing instructions that, when executed by a processor, cause the processor to:

train a hybrid quantum and classical convolutional machine learning algorithm on a training dataset, wherein:

the training dataset comprises a set of historical digital content, wherein a given historical digital content of the set of historical digital content is labeled with a respective compliance guideline, an evaluation result indicating whether the given historical digital content meets the respective compliance guideline, and a respective feature vector of numerical values indicating respective physical attributes of the given historical digital content; and training the hybrid quantum and classical convolutional machine learning algorithm on the training dataset, comprises:

determine a mapping between each physical feature of the given historical digital content to a portion of the respective compliance guideline;

determine an indication of whether a given physical feature of the given historical digital content meets the portion of the respective compliance guideline;

adjust, based at least in part upon the determined mapping and the determined indication, at least one of a first plurality of parameters of a neural network of the hybrid quantum and classical convolutional machine learning algorithm; and adjust, based at least in part upon the determined mapping and the determined indication, a at least one of a second plurality of parameters of quantum circuits of the hybrid quantum and classical convolutional machine learning algorithm;

access a first digital content comprising at least one of text, an image, an audio, or a video;

extract a first set of features from the first digital content, wherein:

the first set of features comprises at least a physical attribute associated with the first digital content;

extract a second set of features from a compliance document, wherein:

the compliance document comprises text that indicates a first compliance guideline to present the first digital content; and the second set of features comprises an indication of the first compliance guideline to present the first digital content;

evaluate the first set of features against the second set of features;

determine, based at least in part upon the evaluation of the first set of features against the second set of features, whether the first digital content meets the first compliance guideline;

generate a feedback message that reflects the determination of whether the first digital content meets the first compliance guideline; and output the generated feedback message.

16. The non-transitory computer-readable medium of claim 15, wherein:

the feedback message reflects the determination that the first digital content does not meet at least a portion of the first compliance guideline; and the feedback message comprises an updated version of the first digital content that complies with the first compliance guideline.

17. The non-transitory computer-readable medium of claim 16, wherein the feedback message further comprises a suggestive instruction that indicates to implement the updated version of the first digital content.

18. The non-transitory computer-readable medium of claim 15, wherein:

the first set of features is represented by a first feature vector comprising a first set of numerical values;

the second set of features is represented by a second feature vector comprising a second set of numerical values; and evaluating the first set of features against the second set of features comprises:

generating, based at least in part upon the first feature vector and the second feature vector, a knowledge graph that comprises the first digital content linked with the first compliance guideline by a line that represents a relationship between the first digital content and the first compliance guideline denoting a validation result of the first digital content satisfying the first compliance guideline; and determining whether the first digital content meets the first compliance guideline based at least in part upon the validation result.

19. The non-transitory computer-readable medium of claim 15, wherein the instructions further cause the processor to evaluate that the first set of features represents the first digital content, by:

generating an input feature vector that represents the first set of features as numerical values;

generating a quantum state vector that represents the input feature vector as a first set of quantum bits;

executing, via a plurality of quantum gates, a quantum convolution operation on the quantum state vector, wherein the quantum convolution operation, when executed by the processor, causes the processor to extract a feature map that indicates a relationship between each local section of quantum state vector;

generating a quantum feature vector in which a set of feature maps is represented by a second set of quantum bits;

performing, via a convolutional neural network layer, a convolution vector operation on the quantum feature vector to reduce a dimension of the quantum feature vector, wherein the quantum feature vector with reduced dimension represents at least one feature, from among the first set of features, that is indicative of the first digital content more than rest of the first set of features;

generating an output feature vector by performing a reverse operation of each of a preceding operation;

comparing the output feature vector with the input feature vector;

determining a distance between the output feature vector and the input feature vector in a vector space; and determining that the determined distance is less than a threshold distance.

20. The non-transitory computer-readable medium of claim 19, wherein generating a quantum feature vector in which the set of feature maps is represented by the second set of quantum bits comprises initiating a quantum bit |0> for each binary bit 0 in the input feature vector and a quantum bit |1> for each binary bit 1 in the input feature vector.

* * * * *